(12) United States Patent  
Matsunaga et al.

(10) Patent No.: US 9,595,719 B2
(45) Date of Patent: Mar. 14, 2017

(54) COMPOSITE METAL FOIL AND PRODUCTION METHOD THEREFOR

(75) Inventors: Tetsuhiro Matsunaga, Ageo (JP); Hajime Watanabe, Ageo (JP); Joe Nishikawa, Ageo (JP)

(73) Assignee: Mitsui Mining & Smelting Co., Ltd., Shinagawa-Ku (JP)

( * ) Notice: Subject to any disclaimer, the term of this patent is extended or adjusted under 35 U.S.C. 154(b) by 0 days.

(21) Appl. No.: 13/985,599

(22) PCT Filed: Mar. 23, 2012

(86) PCT No.: PCT/JP2012/057621
§ 371 (c)(1),
(2), (4) Date: Aug. 15, 2013

(87) PCT Pub. No.: WO2012/137614
PCT Pub. Date: Oct. 11, 2012

(65) Prior Publication Data
US 2013/0323602 A1 Dec. 5, 2013

(30) Foreign Application Priority Data

Apr. 8, 2011 (JP) ................................. 2011-086640

(51) Int. Cl.
*B32B 3/00* (2006.01)
*B05D 1/06* (2006.01)
(Continued)

(52) U.S. Cl.
CPC ................ *H01M 4/80* (2013.01); *B05D 1/12* (2013.01); *B05D 1/14* (2013.01); *B05D 5/12* (2013.01);
(Continued)

(58) Field of Classification Search
CPC . A61F 2310/00401; A61F 2310/00413; C25D 1/04; C25D 1/08; H01G 11/30;
(Continued)

(56) References Cited

U.S. PATENT DOCUMENTS 6,503,432 B1 * 1/2003 Barton et al. ............ 264/173.16
8,497,026 B2 7/2013 Matsunaga et al.
(Continued)

FOREIGN PATENT DOCUMENTS

CN 101794905 A * 8/2010
CN 102762777 A 10/2012
(Continued)

OTHER PUBLICATIONS

James A. Stepro, Nonwoven Fabrics Made from Nickel and Stainless Steel Fibers, Institute of Electrical and Electronics Engineers, 1996, pp. 253-258.*
(Continued)

*Primary Examiner* — Chinessa Adkins
(74) *Attorney, Agent, or Firm* — Burr & Brown, PLLC

(57) ABSTRACT

A composite metal foil is provided comprising a porous metal foil comprising a two-dimensional network structure composed of a metal fiber, and a primer provided on at least a part of the interior and/or periphery of pores of the porous metal foil. According to the present invention, it is possible to obtain a composite metal foil which has a desired function imparted by a primer in addition to superior properties derived from a porous metal foil, in a highly productive and cost effective manner that is suited for continuous production.

18 Claims, 21 Drawing Sheets

(51) Int. Cl.

| | | |
|---|---|---|
| *H01M 4/80* | (2006.01) | |
| *B05D 5/12* | (2006.01) | |
| *B05D 1/14* | (2006.01) | |
| *B05D 7/00* | (2006.01) | |
| *B05D 1/12* | (2006.01) | |
| *B22F 7/04* | (2006.01) | |
| *C22C 49/00* | (2006.01) | |
| *H01G 9/008* | (2006.01) | |
| *H01G 11/68* | (2013.01) | |
| *H01M 4/66* | (2006.01) | |
| *C25D 1/04* | (2006.01) | |
| *C25D 1/08* | (2006.01) | |
| *C25D 5/12* | (2006.01) | |
| *C25D 7/06* | (2006.01) | |
| *H01M 4/04* | (2006.01) | |
| *H01M 10/0525* | (2010.01) | |
| *C25D 3/04* | (2006.01) | |
| *C25D 3/38* | (2006.01) | |

(52) U.S. Cl.
CPC .................. *B05D 7/50* (2013.01); *B22F 7/04* (2013.01); *C22C 49/00* (2013.01); *C25D 1/04* (2013.01); *C25D 1/08* (2013.01); *C25D 5/12* (2013.01); *C25D 7/0635* (2013.01); *H01G 9/016* (2013.01); *H01G 11/68* (2013.01); *H01M 4/0402* (2013.01); *H01M 4/661* (2013.01); *H01M 4/665* (2013.01); *C25D 3/04* (2013.01); *C25D 3/38* (2013.01); *H01M 10/0525* (2013.01); *Y02E 60/13* (2013.01); *Y10T 29/49115* (2015.01)

(58) Field of Classification Search
CPC .. H01M 4/74; H01M 4/806; H01M 2004/021; B01D 39/10; D04H 1/4234
USPC .............................. 442/59; 428/605–607, 550
See application file for complete search history.

(56) References Cited

U.S. PATENT DOCUMENTS

| | | | |
|---|---|---|---|
| 2002/0009647 A1* | 1/2002 | McLin et al. .................. | 429/245 |
| 2002/0078669 A1* | 6/2002 | Shimoda et al. ............... | 55/527 |
| 2003/0064240 A1* | 4/2003 | Ushijima ....................... | 428/592 |
| 2004/0115536 A1* | 6/2004 | Blankenborg et al. ........ | 429/245 |
| 2009/0246626 A1* | 10/2009 | Tasaki et al. .................. | 429/208 |
| 2011/0206992 A1* | 8/2011 | Campbell ............... | H01M 4/80 |
| | | | 429/235 |
| 2011/0247859 A1 | 10/2011 | Zagdoun et al. | |
| 2013/0202960 A1* | 8/2013 | Kim .............................. | 429/209 |

FOREIGN PATENT DOCUMENTS

| | | | | |
|---|---|---|---|---|
| EP | 1 038 994 A1 | 9/2010 | | |
| GB | 2 320 724 A | 7/1998 | | |
| JP | 10-195689 A1 | 7/1998 | | |
| JP | 2001-052710 A1 | 2/2001 | | |
| JP | 2001-202968 A1 | 7/2001 | | |
| JP | 3262558 B2 | 3/2002 | | |
| JP | 2005-251429 A1 | 9/2005 | | |
| JP | WO 2010103927 A1 * | 9/2010 | ............ | H01M 4/133 |
| WO | WO 0200966 A1 * | 1/2002 | | |
| WO | 2009/031555 A1 | 3/2009 | | |
| WO | 2010/034949 A1 | 4/2010 | | |
| WO | 2011/067957 A1 | 6/2011 | | |

OTHER PUBLICATIONS

Nishiyama et al., Conductive Sheet and Electrode, Sep. 16, 2010, machine translation of corresponding document to WO 2010/103927 (EP2408046).*
Tang et al., Energy Storage Device and Manufacturing Method Thereof, Aug. 4, 2010, machine translation of CN101794905.*
International Search Report and Written Opinion dated Jun. 26, 2012 (with English translation).
Japanese Office Action dated Jul. 30, 2013 (with English translation).
Chinese Office Action (With English Translation), Chinese Application No. 201280016393.4, dated May 22, 2015 (7 pages).
Taiwanese Office Action (With English Translation), Taiwanese Application No. 101111878, dated Nov. 5, 2015 (4 pages).

* cited by examiner

COMPOSITE METAL FOIL AND PRODUCTION METHOD THEREFOR

CROSS-REFERENCE TO RELATED APPLICATION

This application claims priority to Japanese Patent Application No. 2011-86640 filed on Apr. 8, 2011, the entire disclosure of which is incorporated herein by reference.

BACKGROUND OF THE INVENTION

1. Field of the Invention

The present invention relates to a composite metal foil and a method for producing the porous metal foil.

2. Background Art

In recent years, lithium-ion secondary batteries and lithium-ion capacitors have been drawing attention as electric storage devices for use in mobile electronic devices such as mobile phones or laptop personal computers, electric vehicles, and hybrid vehicles. As anode current collectors for such electric storage devices, porous metal foils are used or are being considered for use. This is because making the foil porous provides benefits such that the volume or weight of the foil can be reduced (to improve fuel consumption in automobiles), that adhesive power of an active material can be improved by anchoring effect making use of the pores, and that pre-doping of lithium ions (e.g., vertical pre-doping) can be efficiently conducted by making use of the pores.

Known methods for producing such porous metal foils include (1) a method of masking the surface of a substrate in a desired pattern with an insulating film, onto which electrolytic plating is conducted to form pores in accordance with the pattern; (2) a method of providing the surface of a substrate with a specific surface roughness or a specific surface condition, onto which electrolytic plating is conducted to control nucleation; (3) a method of perforating a non-porous metal foil by etching or machining; and (4) a method of forming a three-dimensional network structure by techniques for producing metal foams or plating nonwoven fabrics.

In particular, various techniques have been proposed for the above method (2) since its steps are relatively simple and suitable for mass production. For example, Patent Literature 1 discloses a method for producing a fine-porous metal foil by subjecting a cathode having a surface roughness Rz of 0.8 µm or less to electrolytic plating. Patent Literature 2 discloses a method comprising forming an oxidized film on the surface of a cathode body made of titanium or a titanium alloy by anode oxidation method; electro-depositing copper on the surface of the cathode body to form a porous copper foil; and peeling the foil from the cathode body. Patent Literature 3 discloses a method for producing a porous metal foil provided with an aluminum alloy carrier, comprising forming even projections by etching aluminum; and gradually growing metal particles from the projections as cores for electro-deposition so as to connect the metal particles.

However, the actual situation is that it is not easy for these conventional production methods to produce a foil having a stable aperture ratio in a cost effective manner for reasons such that these production methods generally require a large number of steps and thus have a tendency of increasing production cost, that machining such as punching causes burr, and that anode oxidation process leads to difficulty in controlling nucleation. In addition, a long foil is difficult to produce, and the anode oxidation process had problems with the peelability of the porous film and the stability of the aperture ratio, in that continuous peeling of the foil destroys the oxidized film. In particular, a porous metal foil having a high aperture ratio, which is devoid of burrs and is capable of having pores made smaller, is required for anode current collectors of electric storage devices, such as lithium-ion secondary batteries and lithium-ion capacitors, with improvement in performance.

On the other hand, it is known that battery properties are improved by applying a primer to a metal foil serving as a current collector. For example, Patent Literature 4 discloses that the surface of a current collector is coated with a primer containing lithium polysilicate and, optionally, a carbonaceous component. Patent Literature 5 discloses that an electrically conductive auxiliary agent comprising one or more of a carbon powder, a carbon fiber and an electrically conductive polymer and the like is fixed on a metal foil serving as a current collector substrate, or a planar member such as a metal mesh or punching metal, using a binder.

CITATION LIST

Patent Literature

Patent Literature 1 JPH10-195689A
Patent Literature 2 JP3262558B
Patent Literature 3 JP2005-251429A
Patent Literature 4 JP2001-52710A
Patent Literature 5 WO2009/031555A1

SUMMARY OF THE INVENTION

The inventors have currently found that implementation of metal plating on a certain type of peelable layer in which cracks are formed makes it possible to obtain a porous metal foil which has superior properties in a highly productive and cost effective manner that is suited for continuous production. They have also found that formation of a primer on at least a part of the interior and/or periphery of pores of the metal foil makes it possible to impart a desired function to the metal foil while maintaining or improving superior properties derived from a porous metal foil.

Thus, an object of the present invention is to obtain a composite metal foil which has a desired function imparted by a primer in addition to superior properties derived from a porous metal foil, in a highly productive and cost effective manner that is suited for continuous production.

According to an aspect of the present invention, there is provided a composite metal foil comprising:

a porous metal foil comprising a two-dimensional network structure composed of a metal fiber, and a primer provided on at least a part of the interior and/or periphery of pores of the porous metal foil.

According to another aspect of the present invention, there is provided a method for producing a composite metal foil, which comprises the steps of:

preparing an electrically conductive substrate comprising on its surface a peelable layer in which a crack is generated;

plating the peelable layer with a metal capable of depositing preferentially on the crack, to deposit the metal along the crack, thereby forming a porous metal foil comprising a two-dimensional network structure composed of a metal fiber;

peeling off the porous metal foil from the peelable layer; and coating the porous metal foil with a primer liquid to obtain a composite metal foil.

DESCRIPTION OF EMBODIMENTS

Composite Metal Foil

Figure 1:
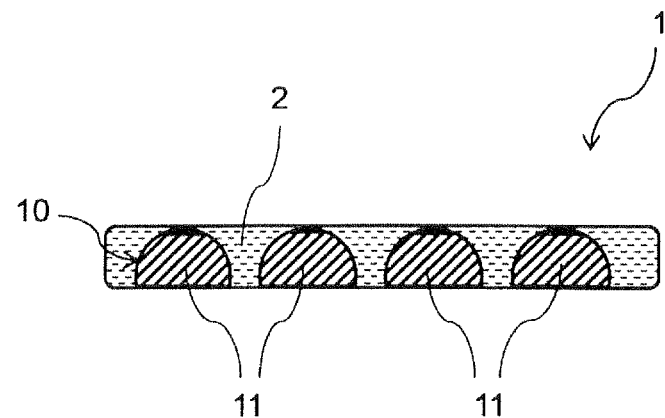
FIG. 1 is a schematic cross-sectional view of an example of the composite metal foil according to the present invention.

FIG. 1 is a schematic cross-sectional view showing an example of the composite metal foil according to the present invention. As shown in FIG. 1, the composite metal foil 1 according to the present invention comprises a porous metal foil 10 and a primer 2. The porous metal foil 10 comprises a two-dimensional network structure composed of a metal fiber 11, and the primer 2 is provided on at least a part of the interior and/or periphery of the pores of the porous metal foil. Providing a primer on at least a part of the interior and/or periphery of the pores of the metal foil makes it possible to impart a desired function to the metal foil while maintaining or improving superior properties derived from a porous metal foil. For example, filling the pores with the primer makes it possible to prevent, during coating, a liquid material from passing through the pores and the metal foil from breaking. In the case of using the metal foil as a current collector, coating of the current collector with a primer enables an improvement in adhesion between the current collector and the active material layer, leading to uniform electrical contact, thereby making it possible to realize stabilization of a power density and an increase in cycle life. Moreover, since ion permeation does not vary even if the pore parts of the porous metal foil is filled with the primer, no adverse effect is exerted on pre-doping of lithium ions in applications such as lithium-ion secondary batteries and lithium-ion capacitors.

Figure 2:
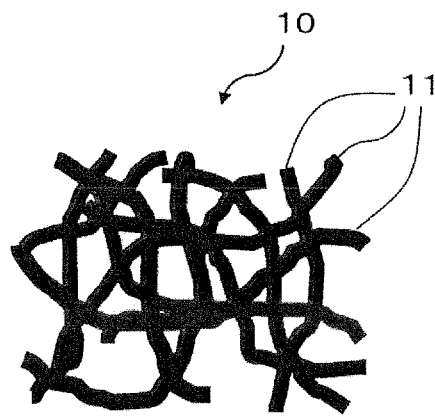
FIG. 2 is a schematic top view of an example of the porous metal foil according to the present invention.

As shown in FIG. 2, the porous metal foil 10 according to the present invention comprises a two-dimensional network structure composed of a metal fiber 11. This porous metal foil 10 has an aperture ratio of preferably 3 to 80%, more preferably 5 to 60%, further preferably 10 to 55%, and still further preferably 20 to 55%. The aperture ratio P (%) is defined herein as:

$$P=100-[(W_p/W_n)\times 100]$$

wherein $W_p/W_n$ is the ratio of the weight $W_p$ of a porous metal foil to the theoretical weight $W_n$ of a non-porous metal foil having a composition and a size which are identical to those of the porous metal foil. This theoretical weight $W_n$ may be calculated by measuring the size of the porous metal foil obtained; calculating the volume (i.e., the theoretical volume of the non-porous metal foil) from the measured size; and then multiplying the resultant volume by the density of the material of the porous metal foil prepared.

In this way, in the porous metal foil 10, it is possible to achieve a sufficient strength based on the numerous metal fibers 11 which are networked in a two-dimensional manner, even if the aperture ratio is set higher. Therefore, it is possible to raise the aperture ratio to a level that has never been achieved, without concern for strength decrease. For example, the porous metal foil 10 may have a tensile strength of preferably 10 N/10 mm or more, and more preferably 15 N/10 mm or more, as measured according to the later-described measuring method, thus making it possible to effectively prevent the porous metal foil from breaking. However, in the case where the porous metal foil is handled with a carrier attached to the foil, a tensile strength lower than the above ranges are of no problem. In this case, it is possible to maximize the aperture ratio without concern for tensile strength.

The porous metal foil 10 has a thickness of preferably 3 to 40 μm, more preferably 3 to 30 μm, further preferably 5 to 25 μm, still further preferably 10 to 20 μm, and most preferably 10 to 15 μm. Within these ranges, a superior balance is achieved between high aperture ratio and high strength. The thickness of the porous metal foil corresponds to the maximum cross-sectional height of the metal fiber, since the porous metal foil of the present invention comprises the two-dimensional network structure composed of the metal fiber. The thickness is preferred to be measured by a commercially available film-thickness measuring device having a spindle which is larger than the pore sizes of the porous metal foil.

The metal fiber 11 is a fiber made of metal, and the metal to be used may be suitably chosen depending on the intended use and is not particularly limited. Preferred metal comprises at least one selected from the group consisting of copper, aluminum, gold, silver, nickel, cobalt, and tin. The term "comprise" means that it embraces metal or alloy mainly containing metal element(s) as listed above, which may include other metal element(s) and unavoidable impurities as the balance, and preferably means that metal element(s) as listed above constitutes not less than 50% by weight of the metal or alloy, with a typical example being metal or alloy comprising metal element(s) as listed above and unavoidable impurities. The above definition will be equally applied to similar expressions mentioned hereinbelow with regard to metal. Among these metals, metal or alloy suitable for anode current collectors of electric storage devices, such as lithium-ion secondary batteries and lithium-ion capacitors, includes metal or alloy comprising at least one selected from the group consisting of copper, copper alloys, nickel, cobalt, and tin, preferably copper. In particular, the two-dimensional network structure is preferred to have an irregular shape derived from a crack, which has been formed on the surface of a substrate.

The fiber diameter of the metal fiber 11 is preferred to be 5 to 80 μm, more preferably 5 to 50 μm, further preferably 8 to 30 μm, most preferably 10 to 20 μm. The term "fiber diameter" is defined as the width (thickness) of the fiber 11 when the porous metal foil is viewed from straight above, and can be measured by using an optical microscope, a field emission scanning electron microscope (FE-SEM), a scanning ion microscope (SIM) or the like. Within these ranges, a superior balance is achieved between high aperture ratio and high strength.

Figure 3:
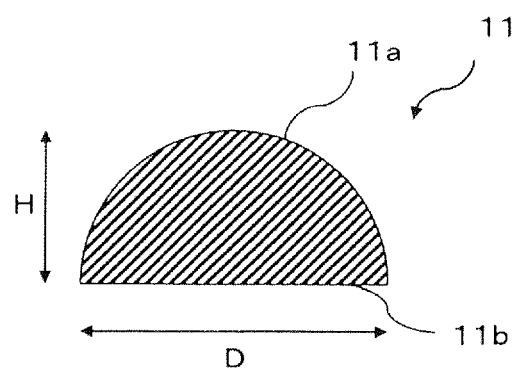
FIG. 3 is a schematic cross-sectional view of the porous metal fiber composing the porous metal foil according to the present invention.

According to a preferred embodiment of the present invention, as shown in FIG. 2, the metal fiber 11 is a branched fiber, which is irregularly networked to constitute the porous metal foil 10. The fiber 11 is formed by numerous metal particles being connected to each other, resulting from nucleation along the later-mentioned crack in the peelable layer. Since it is desirable for the adjacent metal particles to tightly connect with each other through particle growth in order to constitute the metal fiber, the metal particles constituting the metal fiber may no longer have the complete shapes of the particles. In addition, as shown in FIG. 3, it is typical that the metal particles constituting the metal fiber 11 typically have hemispherical shapes having spherical parts 11a and bottom parts 11b at the beginning of formation of particles. The bottom parts 11b of all the metal particles are positioned on the same basal plane, while the spherical parts 11a of all the metal particles are positioned to the same side with reference to the basal plane. In this case, the width D of the bottom part 11b along the basal plane is the fiber diameter, while the maximum cross-sectional height H of the spherical part 11a corresponds to the thickness of the porous metal foil. This basal plane and the bottom part 11b positioned thereon have a shape corresponding to the flat plane shape of the peelable layer which is used during the production, although they are not limited to this shape when the foil is produced by other production methods. According to the inventors' experience, the average ratio of the maximum cross-sectional height H to the fiber diameter D of the fiber 11 is, but not limited to, typically 0.30 to 0.70, more typically 0.40 to 0.60, further typically 0.45 to 0.55, and most typically about 0.50, and may be adjusted by modifying the plating conditions or the like as appropriate. In addition, according to the inventors' experience, the average area of the pores in the porous metal foil 10 is, but not limited to, typically 3 to 5,000 $\mu m^2$, more typically 3 to 3,000 $\mu m^2$, further typically 3 to 2,000 $\mu m^2$. Furthermore, according to the inventors' experience, in the porous metal foil 10, the ratio of the number of pores having areas of not more than one-half of the largest pore area to the number of the total pores is, but not limited to, typically not less than 60%, more typically not less than 70%, and further typically not less than 80%.

The primer 2 is provided on at least a part of the interior and/or periphery of pores of a porous metal foil. It is possible to use, as the primer 2, various known priming agents, pre-treating agents and other compositions, which are capable of imparting some functions to the porous metal foil in advance, and the primer is preferably a primer which can impart a desired function to the metal foil while maintaining or improving superior properties derived from the porous metal foil. Examples of the primer include a current collector primer, a rust preventive agent, an adhesive agent, an electrically conductive coating material and the like. As shown in FIG. 1, pores are typically filled with a primer 2 over the whole surface of the porous metal foil. Depending on the required used and performances, only pores in a partial region may be filled with the primer, while pores in the other region may remained. Alternatively, the primer may be applied only to the periphery (that is, the surface of the metal fiber) of individual pores, while pores may remain without filling the interior of pores. The primer 2 may be not only in a dry solid, but also in any form such as semi-solid, semi-fluid or fluid as long as the primer can adhere to a porous metal foil 10. The primer may not be dried, or may contain a solvent derived from a primer liquid. This is because the primer may optionally be treated appropriately by heating or the like in the subsequent step, which is performed depending on the use. The method for formation of the primer 2 may be appropriately selected depending on properties of the primer to be used, and examples of the method include, but are not particularly limited to, an immersion method, various slurry coating methods by a die coater, an electrophoretic deposition coating method, a chemical vapor deposition (CVD) method, a physical vapor deposition (PVD) method, and various printing technique such as screen printing, gravure printing, flexo printing and ink-jet printing techniques.

The primer is preferably a current collector primer since a porous metal foil is suited for use in a current collector. The current collector primer can serve as both an electrically conductive coating material and an adhesive which are provided between an active material layer and a current collector, and primers with various known compositions can be used. This enables improvement in adhesion to a current collector or durability of an active material layer, omission of the step of a current collector surface treatment before coating of the active material, improvement in corrosion resistance to protect a current collector, relaxation of stress of an active material layer and a current collector, and reduction in contact resistance between an active material layer and a current collector to bring about uniform in-plane current distribution. Use of the composite electrode foil coated with a current collector primer exerts various effects in electric storage devices, such as elongation in cycle life and storage life, reduction in internal resistance, improvement in practical capacity, reduction in energy loss, and improvement in output properties.

Typically, the current collector primer comprises an electrically conductive material, a binder and, optionally, a solvent derived from additives and a primer liquid. Examples of the electrically conductive material include electrically conductive carbon particles, an electrically conductive carbon fiber, metal particles, and an electrically conductive polymer, among which electrically conductive carbon particles are particularly preferable.

The electrically conductive carbon particles are preferably particles such as graphite or carbon black. The graphite may be in any form such as scaly, fibrous or bulky form. Examples of the carbon black include acetylene black, ketjen black, and furnace black. In terms of easy lowering of volume resistivity of the primer part, the electrically conductive carbon particles preferably have a primary particle diameter of 50 nm or less, and more preferably 40 nm or less. Examples of the electrically conductive carbon fiber include a vapor grown carbon fiber (VGCF). In terms of easy lowering of volume resistivity of the primer part, the electrically conductive carbon fiber preferably has a diameter of 50 nm or less, and more preferably 40 nm or less. Examples of the electrically conductive polymer include a polyacetylene (trans-type)-based polymer, a polyparaphenylene-based polymer, a polyphenylenevinylene-based polymer, a polypyrrole-based polymer, and a poly(3-methylthiophene)-based polymer. The electrically conductive polymer imparts electrical conductivity by adding an electron donor as a dopant, and examples thereof include halogens such as $Cl_2$, $Br_2$, and $I_2$; Lewis acids such as $PF_5$, $AsF_5$, and $SbF_5$; and alkali metals such as Li, Na, and Rb.

The binder is not particularly limited as long as it enables fixation of an electrically conductive material to a porous metal foil and also has resistance to an electrolytic solution of a battery, and is preferably a binder which can fill pores of a porous metal foil or adhere along with the surface of a metal fiber thereby covering the periphery of pores. Preferred examples of the binder include synthetic resin-based binders such as polyvinylidene fluoride (PVdF), polyacrylonitrile (PAN), polyvinyl chloride (PVC), and an ethylene-propylenediene copolymer (EPDM); synthetic rubber-based binders such as a fluorine rubber (FR), a butadiene rubber (BR), and a styrene-butadiene rubber (SBR); and natural product-based binders such as chitosan or chitosan derivatives. The additive amount of the electrically conductive material is preferably from 20 to 70% by weight, and more preferably from 30 to 60% by weight, based on the total weight of the electrically conductive material and the binder.

Preferred examples of the additive include dispersing agents or thickeners, such as carboxymethyl cellulose (CMC). Preferred examples of the solvent include volatile solvents such as N-methylpyrrolidone (NMP), and water. The current collector primer may contain lithium polysilicate as disclosed in Patent Literature 4. Those contained in the primer may be appropriately selected depending on the use.

The thickness of the parts composed of the primer 2 may be identical to the thickness of a porous metal foil 10. Therefore, the composite metal foil 1 preferably has a thickness of 3 to 40 μm, more preferably 3 to 30 μm, further preferably 5 to 25 μm, still further preferably 10 to 20 μm, and most preferably 10 to 15 μm.

According to an aspect of the present invention, the porous metal foil 10 or composite metal foil 1 has a first side having a higher glossiness, and a second side having a lower glossiness located on the opposite side of the first side. A ratio of glossiness $G_S$ of the first side to glossiness $G_M$ of the second side as measured at incident and reflection angles of 60 degrees in accordance with JIS Z 8741 (1997), i.e., $G_S/G_M$ (hereinafter referred to as a ratio $G_S/G_M$), is from 1 to 15. Herein, the back side corresponds to the second side when the front side is referred to as the first side, while the front side corresponds to the second side when the back side is referred to as the first side. The glossiness is an indicator suited for reflection of the surface shape and the surface roughness of the metal foil. For example, the metal surface which is smooth with less unevenness tends to have a high glossiness, while the surface which is rough with large unevenness tends to have a low glossiness. As long as the present inventors know, in a porous metal foil comprising a two-dimensional network structure composed of a metal fiber, the ratio $G_S/G_M$ is approximately from about 17 to 20 due to the production method. According to the present aspect, it is possible to provide a porous metal foil or composite metal foil in which the difference in properties between the both sides has been significantly reduced by making the surface shapes or surface roughnesses of the both sides closer so that the ratio $G_S/G_M$ reaches a value of 1 to 15.

The porous metal foil or composite metal foil thus having a reduced difference in properties between the both sides has high usability in various uses. For example, when a porous metal foil (for example, a copper foil) is used as a current collector for electric storage devices, there are various advantages in that (1) it becomes unnecessary to change coating conditions of an active material slurry depending on the surface to be coated; (2) when a porous metal foil is assembled into a multilayered electric storage devices, long-term reliability can be enhanced by eliminating a difference in electrode reaction between the sides; and (3) it is possible to provide a degree of design freedom to lithium ion doping or arrangement to the inside or outside of a cylindrical roll.

The ratio of glossiness $G_S$ of the first side to glossiness $G_M$ of the second side, i.e., $G_S/G_M$, is from 1 to 15, and the upper limit is preferably 14, more preferably 13, further preferably 12, and still further preferably 11. Although a ratio $G_S/G_M$ closer to 1 is theoretically preferable as resulting in a smaller difference in properties between the both sides, realization of such a ratio $G_S/G_M$ may increase the burden in the production of a porous metal foil step (for example, a surface treatment). Therefore, the ratio $G_S/G_M$ may be appropriately set so as to fall within the above range depending on the use and performances to be required.

Figure 4:
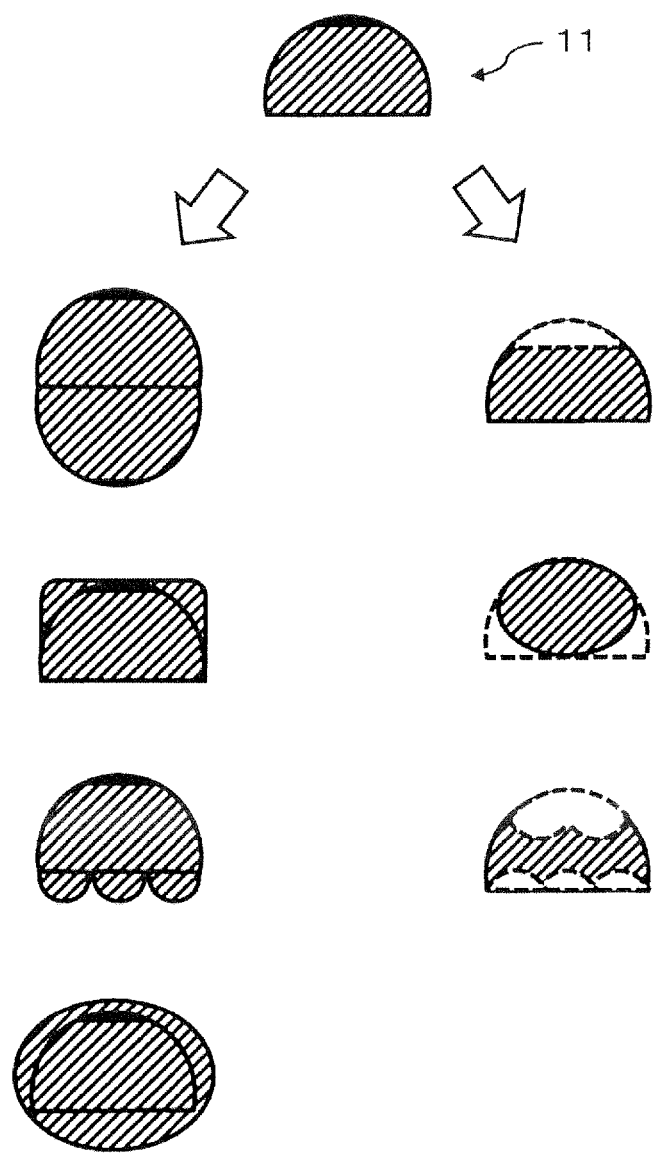
FIG. 4 is a schematic cross-sectional view showing the shape of the metal fiber composing the porous metal foil according to the present invention after a surface treatment. In the figure, shapes listed on the left side are directed to an aspect in which a metal fiber is made thick by a surface treatment, while shapes listed on the right sides are directed to an aspect in which a metal fiber is made thin by a surface treatment.

Typically, in the porous metal foil 10 having a ratio $G_S/G_M$ within the above range, a cross-sectional shape of the metal fiber 11 alters slightly or significantly from the semi-circular shape shown in FIG. 3 for the following reason. This is because while a difference in roughness or unevenness between spherical parts 11a and planar bottom parts 11b is reflected to a difference in glossiness (namely, a high ratio $G_S/G_M$), altering the shape of at least one of spherical parts 11a and planar bottom parts 11b reduces the difference in roughness or unevenness between the side derived from spherical parts 11a and the side derived from planar bottom parts 11b. Some specific examples of a cross-section of a metal fiber are shown in FIG. 4. As shown in a column on the left side of FIG. 4, a metal fiber 11, which originally had a semicircular cross-section, may lose the original semicircular shape by deposition of additional metal on the curved surface and/or the bottom surface thereof, and thus may be provided with a cross-sectional shape in which an oval shape, a circular shape, an approximately rectangular shape, or other unevenness is added or eliminated. As shown in a column on the right side of FIG. 4, a metal fiber 11, which originally had a semicircular cross-section, may lose the original semicircular shape by scraping, through polishing or the like, a part of the metal fiber from the curved surface and/or the bottom surface thereof, and thus may form a shape in which an approximately trapezoidal shape, an oval shape, a circular shape, or other unevenness is added or eliminated. If a predetermined ratio $G_S/G_M$ can be realized, a cross-section of the metal fiber 11 may substantially maintain its original semicircular cross-section. For example, even in the case of a porous metal foil composed of a metal fiber having a semicircular cross-section shown in FIG. 4, the ratio $G_S/G_M$ may be made within the above range by providing the shape to the foil per se.

Production Method

An example of the method for producing the composite metal foil according to the present invention will be described hereinbelow, while the composite metal foil according to the present invention is not limited to those produced by this production method but includes those produced by other production methods. In the method for producing the composite metal foil according to the present invention, a porous metal foil is produced first, and then a primer liquid is applied to the porous metal foil to obtain a composite metal foil.

Figure 5:
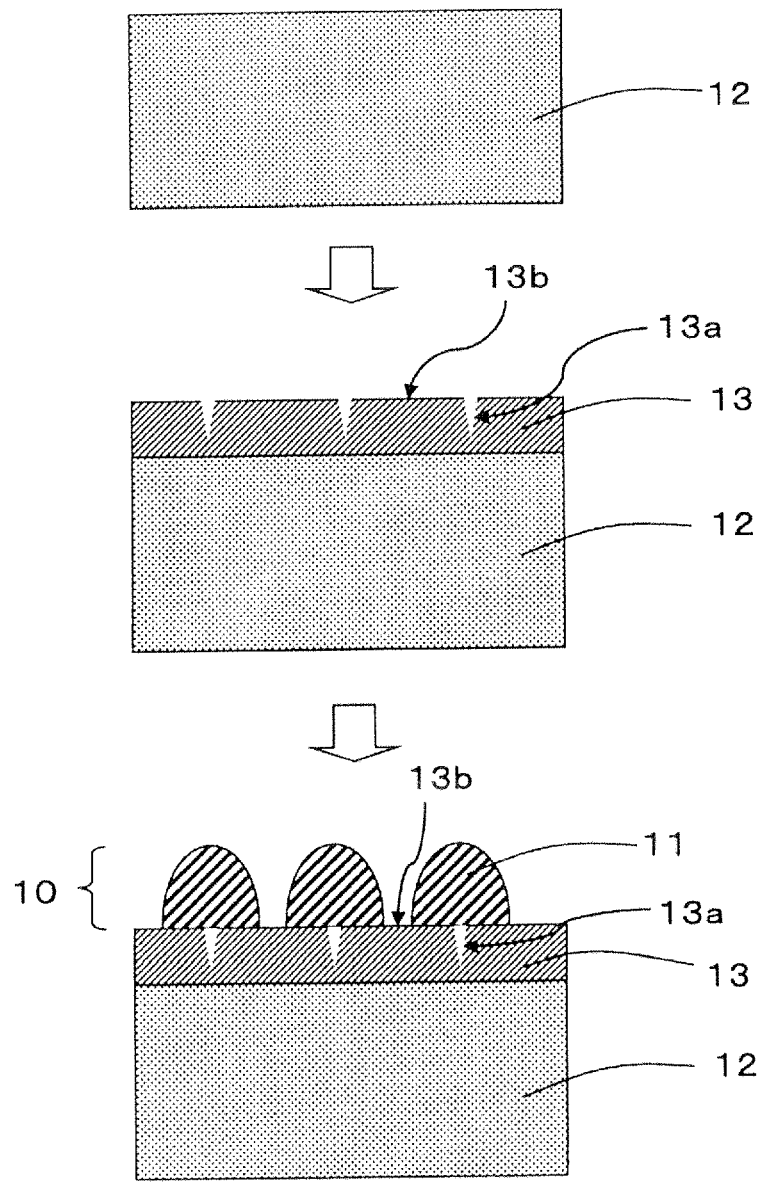
FIG. 5 is a flow diagram showing the flow of the process of producing the porous metal foil according to the present invention.

FIG. 5 shows the flow of the process of producing the porous metal foil according to the present invention. In the production method of the present invention, an electrically conductive substrate 12 is first provided as a support for producing the porous metal foil. The electrically conductive substrate may be a substrate having an electrical conductivity which enables plating thereon. Any of inorganic materials, organic materials, laminates, and materials having metallic surfaces can be used as the substrate, metals being preferred. Preferred examples of such metals include metals, such as copper, nickel, cobalt, iron, chromium, tin, zinc, indium, silver, gold, aluminum, and titanium, and alloys containing at least one of these metal elements, more preferred examples being copper, copper alloys, nickel, nickel alloys, titanium, titanium alloys, and stainless steels. The configuration of the electrically conductive substrate is also not limited, allowing the use of substrates with various configurations including foil, plate, and drum. In the case of drum, an electrically conductive metal plate may be used with the plate being wrapped around the drum. The thickness of the electrically conductive metal plate in this case is preferred to be 1 to 20 mm. The electrically conductive substrate supports the produced porous metal foil during its processing or until just before its use, thus improving the handleability of the porous metal foil. In particular, it is preferable to use a metal foil as the electrically conductive substrate since there are advantages in that the metal foil used as the electrically conductive substrate can be reused as it is after the production of the porous metal foil, or can be recycled through melting and foil production. In this case, the thickness of the metal foil is preferred to be 10 μm to 1 mm as ensuring a strength which prevents wrinkles or twists from being generated during the metal foil production process and the subsequent processing-and-transporting process or the like.

The shape of the crack in the peelable layer varies depending on the material and roughness of the electrically conductive substrate, and thus may change the properties of the porous metal foil, such as aperture ratio. On the other hand, it is a matter of course that the shape of the porous metal foil may change even depending on the type or conditions of the metal plating. In order to obtain a desired porous metal foil in consideration of these, selection of the electrically conductive substrate and setting the conditions for forming the peelable layer and/or those for plating may be done suitably depending on the necessity.

The peelable layer 13 is then formed on the electrically conductive substrate 12, with cracks 13a being generated in the peelable layer 13. Prior to the formation of the peelable layer 13, it is preferred to conduct pretreatment, such as acid washing and degreasing, to the electrically conductive substrate 12 to cleanse its surface. The peelable layer 13 is a layer which facilitates the peeling of the porous metal foil 10 to be formed thereon, and is composed of a material which is capable of generating the cracks 13a and has a tendency of being easily plated at the cracks 13a as well as being hardly plated at regions 13b where no cracks exist. That is, a material which allows a certain type of metal to preferentially deposit on the generated cracks 13a by plating is used as the peelable layer 13. In addition, this peelable layer may be formed in a multilayered manner, in which cracks may be formed only in the upper layer or otherwise cracks may be formed not only in the upper layer but also in the lower layer(s). An oxidized film may be formed on the surface of peelable layer by anode oxidation method. A diamond-like carbon (DLC) or the like may be present on the surface of the peelable layer. It is preferred to control formation of the cracks 13a so that cracks can be spontaneously generated by the stress in the peelable layer 13, although the cracks need not generate at the time of the formation of the peelable layer but may generate during the subsequent steps such as washing-and-drying process or machining process. Although cracks are usually undesirable, the production method of the present invention is characterized by rather taking advantage of the cracks in a positive way. In particular, since cracks usually have characteristics of being formed in a way such that branched lines are networked in a two-dimensional manner, forming metal fiber along the cracks can provide a porous metal foil having a high aperture ratio and a high strength. Since generation of cracks is always of concern in usual film-forming processes, those skilled in the art who engage in film forming is empirically familiar with the conditions for generating cracks, and can easily choose the conditions to the best of their experience and knowledge, for example, by adjusting composition control of the plating bath or the like, thickness of the peelable layer, conditions of current density, bath temperature, stirring conditions, or post heating.

The peelable layer 13 comprises at least one selected from the group consisting of chromium, titanium, tantalum, niobium, nickel and tungsten or is composed of an organic material such as resins. The peelable layer is preferred to comprise at least one from chromium, titanium and nickel which have high hardness, in terms of continuous peelability, durability and corrosion resistance, and is more preferred to be composed of chromium, a chromium alloy or a chromium oxide in that it forms passive state, which facilitates the peeling. The thickness of the peelable layer 13 is preferred to be in the range of 1 nm to 100 μm, more preferably 0.1 to 50 μm, further preferably 1 to 30 μm, most preferably 2 to 15 μm. These compositions and thicknesses enables generation of cracks, while providing the peelable layer with a higher resistance in view of the electrically conductive substrate to facilitate the formation and peeling of the porous metal foil 10 which is to be formed on the peelable layer. Therefore, the peelable layer is desired to be composed of a material having a resistance higher than that of the electrically conductive substrate.

The peelable layer 13 can be formed by various film forming methods, which include, but not limited to, electrolytic plating, non-electrolytic plating, sputtering method, physical vapor deposition (PVD), chemical vapor deposition (CVD), sol-gel method, and ion-plating method. In terms of production efficiency or the like, it is preferable that the peelable layer 13 be also formed by electrolytic plating. As necessary, the peelable layer 13 may be further subjected to heat treatment and/or polishing, without departing from the spirit of the invention. Specifically, polishing is permitted to such an extent that the surface of the peelable layer 13 is merely cleansed, but it is a matter of course that polishing should not be conducted so excessively as to disfigure the cracks. Preferably, the peelable layer 13 thus obtained is washed with water or the like and then dried.

In the case of conducting chromium electrolytic plating, preferred chromium plating solutions include Sargent bath and hard chromium plating baths, more preferably hard chromium plating baths. Preferred examples of commercially available hard chromium plating baths include Anchor 1127 produced by Meltex Inc., HEEF-25 produced by Atotech, and Mac-1 produced by Nihon MacDermid Co., Ltd. The chromium plating bath compositions and electrolytic conditions are shown below, although it is permitted to depart from the following ranges as far as a desired porous metal foil is obtained.

TABLE 1

Compositions and Electrolytic Conditions of Preferred Chromium Plating Solutions

| | Basic Bath | Commercially Available Hard Chromium Plating Baths | | |
|---|---|---|---|---|
| | Sargent Bath | Anchor 1127 | HEEF-25 | Mac-1 |
| Bath Compositions (g/L) | | | | |
| Chromic Anhydride | 250 | 280-320 | 200-300 | 250-300 |
| Sulfuric Acid | 2.5 | 3.3-3.9 (1.1-1.3 wt %) | 2.0-4.5 | 3.5-4.0 |
| Electrolytic Conditions | | | | |
| Cathode Current Density (A/dm$^2$) | 20-40 | 30-60 | 20-90 | 10-100 |
| Temperature (° C.) | 45-60 | 55-60 | 50-65 | 55-60 |

A stable chromium plating bath typically contains a small amount of trivalent chromium, of which the amount is about 2 to 6 g/L. A catalyst such as an organic sulfonic acid may also be added to the hard chromium plating bath. The concentration of chromic anhydride can be controlled in terms of Baume degree. Furthermore, since impurities, such as iron, copper and chloride ion, affect the plating condition, attention needs to be paid to control the maximum amount of dissolved impurities. An anode used for the chromium plating is preferred to be titanium coated with lead oxide or with a Pb—Sn alloy. Typical examples of such commercially available anodes include Ti—Pb electrode (Sn: 5%) produced by SPF Co., Ltd. and Exceload LD produced by Japan Carlit Co., Ltd.

The peelable layer 13 is then plated with a metal capable of depositing preferentially on the cracks 13a, to grow numerous metal particles 11 along the cracks 13a, so that the porous metal foil 10 comprising a two-dimensional network structure composed of a metal fiber is formed. As described above, the peelable layer 13 has the cracks 13a having a tendency of being easily plated thereon and the crack-free regions 13b having a tendency of being hardly plated thereon. The reason why the cracks 13a tend to be easily plated is that current flows more easily in parts where the cracks 13a exist than in regions 13b where no such cracks exist, resulting in preferential occurrence of nucleation and its growth on the cracks 13a. The metal capable of depositing preferentially on the cracks 13a preferably comprises at least one selected from the group consisting of copper, aluminum, gold, silver, nickel, cobalt, and tin, more preferably at least one selected from the group consisting of copper, silver, and gold, further preferably copper.

The porous metal foil 10 can be formed by plating methods with no particular limitation, which include electrolytic plating and non-electrolytic plating, between which electrolytic plating is preferable since it enables metal to deposit on the cracks 13a efficiently. The plating conditions may be determined in accordance with known methods and are not particularly limited. For example, copper plating is preferred to be conducted in a copper sulfate plating bath. In the copper plating, preferred plating bath compositions and electrodepositing conditions include, but not limited to, copper sulfate pentahydrate in a concentration of 120 to 350 g/L; sulfuric acid in a concentration of 50 to 200 g/L; a cathode current density of 10 to 80 A/dm$^2$; and a bath temperature of 40 to 60° C.

An additive agent may be suitably added to the plating solution to enhance properties of the metal foil. In the case of copper foil, for example, preferred examples of such additive agent includes hide glues, gelatins, chlorine, sulfur-containing compounds such as thiourea, synthesized additive agents such as polyethylene glycols. With these preferred additive agents, it is possible to control dynamic properties and surface condition of the metal foil. The concentration of the additive agent is not limited but is normally in the range of 1 to 300 ppm.

According to a preferred aspect of the present invention, it is preferred that the interior of cracks 13a is filled in advance with an electrically conductive material. It is possible to use, as the electrically conductive material for filling the cracks, various known materials, metals, alloys and the like as long as they have higher conductivity than that of a passive film which can be used in the peelable layer. When metal plating is performed using the peelable layer 13 in which the interior of cracks 13a is filled with the electrically conductive material, cracking selectivity of plating is noticeably improved, and also a metal fiber is formed in a smooth linear form, not in a beaded shape in which grown particles are connected to each other. Filling of metal in such cracks 13a can be realized by repetition of electroplating such as electrolytic copper plating (namely, performing of idle operation) in advance. However, cracks may not be sometimes filled only by the idle operation depending on conditions of the plating solution. This tendency particularly applies to the case of nickel plating. In this case, plating such as nickel plating may be conducted after an idle operation is performed in advance using a metal which easily penetrates into the cracks, such as copper, silver, and gold or, alternatively, after the cracks are filled with an electrically conductive material by coating with an electrically conductive paste. According to this aspect, it is possible to deposit a metal which has a tendency of being hardly deposited along cracks as compared with copper, such as nickel. Since a smooth metal fiber is formed with high crack selectivity, a porous metal foil can be efficiently produced. Even if the porous metal foil is peeled off, metal deposits in cracks 13a remain without being peeled off. Therefore, when the interior of cracks 13a is once filled, the equivalent effects can be obtained by repeatedly using the peelable layer 13 without conducting the idle operation.

Alternatively, an attempt is made to preliminarily prepare, as an electrode for the production of a porous metal foil, an electrode with a peelable layer in which the interior of the cracks has been filled with metal deposits, it is possible to immediately initiate the production of a porous metal foil using the electrode without conducting an idle operation. Thus, according to an aspect of the present invention, there is provided an electrode for producing a porous metal foil, the electrode comprising an electrically conductive substrate preferably in a rotary drum form; a peelable layer provided on the electrically conductive substrate, in which the peelable layer has cracks generated on its surface; and an electrically conductive material filled in the cracks.

The porous metal foil may be peeled off from the electrically conductive substrate having the peelable layer to obtain an isolated porous metal foil. The peeled foil may be transferred to another substrate such as a film provided with an adhesive layer thereon. Nevertheless, in the case of employing a porous metal foil with no primer, this peeling step is not necessary, and the foil may be configured so that it can be handled as a porous metal foil product which remains provided with the substrate via the peelable layer and may not be peeled off until just before use. In this case, the porous metal foil can be more easily handled, while it becomes possible to significantly increase the aperture ratio or significantly reduce the film thickness because high strength is not so required due to the support by the substrate.

Figure 6:
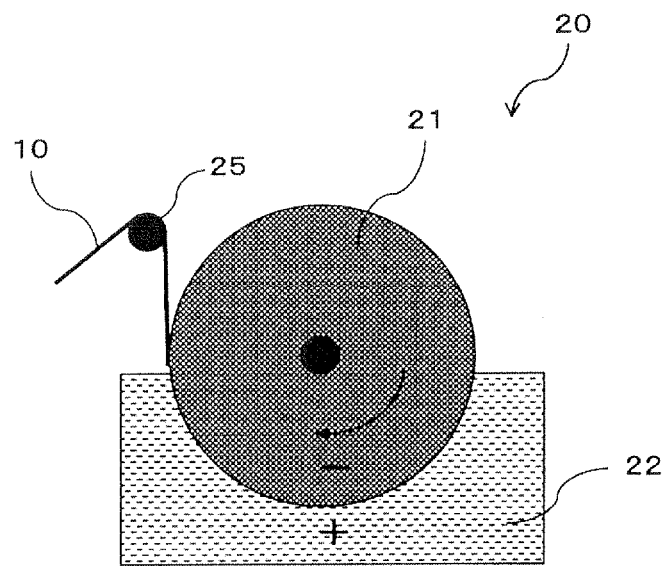
FIG. 6 is a schematic cross-sectional view showing an example of a rotary drum type foil forming apparatus for producing the porous metal foil according to the present invention.

According to a preferred aspect of the present invention, an electrically conductive substrate provided with a peelable layer may be configured in a rotary drum form, and the contacting step, the plating step, the peeling step, and the drying step may be sequentially repeated by rotation of the electrically conductive substrate. An example of a schematic cross-sectional view of the rotary drum type foil forming apparatus is shown in FIG. 6. A foil forming apparatus 20 shown in FIG. 6 comprises a rotary drum 21 made of an electrically conductive substrate (for example, a drum made of stainless steel) provided with a peelable layer in which cracks are formed on the surface (for example, chromium plating layer); an electroplating bath 22 in which the lower part of the rotary drum 21 is immersed in a plating solution; and a peeling roll 25 for peeling a porous metal foil 10 from the rotary drum and conveying the porous metal foil. When the rotary drum 21 is rotated in this foil forming apparatus 20, plating is performed along cracks in the electroplating bath 22 to form the porous metal foil 10. After peeling, the rotary drum 21 may be optionally washed with water or dried. The foil forming apparatus 20 is configured to perform drying by natural drying. However, drying may be artificially performed by a heating unit that is separately provided. At any rate, the rotary drum subjected to the drying step is subjected again to a series of steps by rotation, followed by subjecting to the plating step, the peeling step and, optionally, the drying step. According to this aspect, it becomes possible to quite effectively mass-produce a reinforced porous metal foil in a roll form, using a rotary drum type foil forming apparatus. In the rotary drum 21, the interior of cracks formed on the surface of the peelable layer is preferably filled in advance with metal deposits.

The porous metal foil thus peeled from the peelable layer typically has a first side having a higher glossiness due to a contact surface with the peelable layer, and a second side having a lower glossiness located on the opposite side of the first side. It is possible to decrease the ratio of the glossiness of the first side to that of the second side by subjecting any one of the first side and the second side to a surface treatment. For example, a ratio $G_S/G_M$ can be adjusted within a range from 1 to 15. However, the method of the present invention is not limited to this numerical range, allowing a desired glossiness ratio to be realized depending on the use. The technique for such surface treatment may be any known technique as long as it can lower the ratio of the glossiness of the first side to that of the second side, and is preferably conducted by (1) further plating with metal, (2) formation of treated film by a rustproofing treatment, a chromate treatment or the like, or (3) scraping of a metal fiber by electric polishing such as reverse electrolysis, physical polishing such as buffing, chemical polishing such as CMP, or blasting treatment such as sandblasting, or any combination thereof. The above techniques (1) and (2) is to attach to a metal fiber a metal that constitutes the foil or a surface treating agent that is generally acceptable to a metal foil, thereby altering the shape of the metal fiber as shown in the column on the left side of FIG. 4. On the other hand, the above technique (3) is to partially scrape the metal fiber, thereby altering the shape of the metal fiber as shown in the column on the right side of FIG. 4. As long as a desired glossiness ratio can be attained, mere deformation without adhesion of metals or scraping of metals may be acceptable.

According to another aspect of the present invention, it is also possible to lower the ratio of the glossiness of the first side to that of the second side by using an electrically conductive substrate having a peelable layer provided with unevenness to produce the porous metal foil. Specifically, in this method, there is provided an electrically conductive substrate having a peelable layer provided with unevenness. Then, the peelable layer is plated with a metal capable of depositing preferentially on cracks to deposit metal along cracks, thereby forming a porous metal foil comprising a two-dimensional network structure composed of a metal fiber. Finally, the porous metal foil is peeled off from the peelable layer to provide a first side having a higher glossiness located at the side which had not been in contact with the peelable layer and a second side having a lower glossiness to which unevenness of the peelable layer had been transferred or, alternatively, to provide a second side having a lower glossiness located at the side which had not been in contact with the peelable layer and a first side having a higher glossiness to which unevenness of the peelable layer had been transferred, thereby obtaining a porous metal foil in which the ratio of the glossiness of the first side to that of the second side had been decreased. Namely, when the peelable layer is flat, the flatness is transferred onto one side of the metal foil to give rise to a difference in unevenness or roughness between the side surface and the other side. In this way, imparting unevenness in advance to the peelable layer that should be normally flat makes it possible to impart unevenness to one side of the metal that should be normally flat as well. As a result, it is possible to decrease the glossiness ratio between the one side and the other side, which has an unevenness or roughness derived from the curved surface-shaped, deposited surface of the metal fiber. The technique of imparting unevenness in advance to the peelable layer is not particularly limited and may be forming unevenness on the peelable layer per se by appropriately controlling plating conditions such as chromium plating conditions or, alternatively, imparting unevenness to the electrically conductive substrate per se and forming thereon a peelable layer.

According to a preferred aspect of the present invention, the porous metal foil may be subjected to a surface treatment using a metal, an alloy or the other surface treating agent. Examples of the metal and alloy include metals such as zinc, tin, nickel, molybdenum, palladium, cobalt, copper, silver, gold, and manganese, and any alloys of these metals (for example, Ni—Zn, Sn—Zn). Examples of the other surface treating agent include chromates, rust preventives, silane coupling agents and the like.

Finally, a composite metal foil can be obtained by coating the peeled porous metal foil with a primer liquid and optionally drying it. As the primer liquid, it is possible to use various known priming agents, pre-treating agents and other compositions, capable of imparting some functions in advance to the porous metal foil. The primer liquid is preferably a primer liquid capable of imparting a desired function to a metal foil while maintaining or improving superior properties derived from a porous metal foil. While such primer and the constituent components thereof are as mentioned above, the primer liquid preferably contains a solvent so as to impart a liquid form suited for coating. The primer liquid is preferably a current collector primer liquid.

Figure 7:
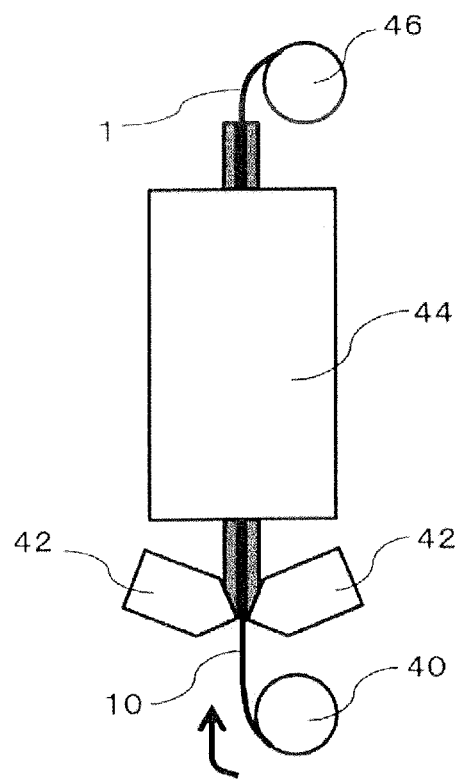
FIG. 7 is a schematic view showing simultaneously double-side coating used in the production method of the present invention.

The coating method of the primer liquid is not particularly limited and may be performed in accordance with various known coating techniques, and a vertical coater, a horizontal coater, and a combination thereof can be used. Coating using the vertical coater is preferably performed by a simultaneously double-side coating technique using a vertical dip coater, a vertical die coater or the like. It is thus possible to realize high coating accuracy by effectively preventing the primer liquid from falling through the pores of the metal foil in the case of the horizontal coater. FIG. 7 shows a schematic view of the simultaneously double-side coating. In the simultaneously double-side coating, two continuous coaters 42, 42 are oppositely disposed so as to be able to apply a primer liquid to the both sides of a porous metal foil 10 supplied through a supply roll 40. The continuous coaters 42, 42 may be a both-side die coater, a both-side dip coater or the like, which can continuously apply a primer liquid to the both sides of the porous metal foil 10. When coated with the primer liquid, the porous metal foil 10 becomes a composite metal foil 1, which is passed through a dryer 44 and then discharged from a discharge roll 46 to obtain a composite metal foil 1 provided with the dried primer 2. On the other hand, in the coating using the horizontal coater, it is preferred to make the primer liquid less likely to spill through the pores by appropriately adjusting the pore diameter and the pore shape of the porous metal foil 10 as well as the viscosity of the primer liquid. Nevertheless, when the use of the composite metal foil 1 does not require such a high coating accuracy, such adjustment is unnecessary. Coating with a primer liquid may be performed twice by using a vertical coater and a horizontal coater. In this case, it is preferable that the primer liquid be thinly applied by using the vertical coater to conduct pore filling and drying, and then subjected to finish coating with the primer liquid at high coating accuracy by using a horizontal coater with high mass productivity.

Applications

Typical applications of the metal foil according to the present invention include anode or cathode current collectors of electric storage devices, such as lithium-ion secondary batteries and lithium-ion capacitors. Alternatively, the metal foil can be used in various applications, such as screening devices for fine-powder classification or solid-liquid separation, catalyst carriers, nets to be used in oxygen inlets of microorganism storage containers, dust-proof filters for clean rooms, antibacterial filters for liquids, filters for liquid reforming, electromagnetic-wave shields, magnetic materials, electrically conductive materials, decoration sheets, noise reduction materials, defluoridation filters, various shield materials, high frequency cables (for example, copper-foil coil type), and transparent electrodes serving as an ITO substitute material. For example, when the composite or porous metal foil is used in inner layers of a printed board as an electrically conductive material or the like, it is possible to release a gas derived from a resin, a solvent or the like through the pores, so that generation of blisters can be prevented. In addition, using the composite or porous metal foil as an electrically conductive material or the like for forming circuits can attain weight reduction due to the reduction of the metal usage.

In applications of a current collector, the following preferred embodiments are considered. Namely, (1) it is possible to reduce the risk of a short circuit if peeling should occur, by disposing the side from which an active material of a porous metal foil is more easily to be peeled (flat side having a higher glossiness) to face toward the inside of a cylindrical current collector. (2) It is possible to make a relational expression between the pore diameter of a foil and the particle size of an active material for obtaining an optimum value so that the contact area can be maximized (thereby making it possible to prevent a situation where a large-sized active material does not enter the pores). (3) It is also possible to conduct double-side coating with an active material slurry after performing a primer treatment for filling the pores as mentioned above. (4) Although the conventional metal foils may cause spreading of a slurry by about 1 to 2 mm at the end of the coated part during the coating with an active material slurry, the porous metal foil of the present invention has a possibility of preventing the spreading. In addition, it is more effective to partially apply a water-repellent silane coupling agent to a porous metal foil to make the porous metal foil partially water-repellent.

EXAMPLES

The present invention will be explained in more detail below with reference to Examples.

Example A1

Preparation of Porous Metal Foil

A copper foil having a thickness of 35 μm was prepared as an electrically conductive substrate. A chromium plating for forming a peelable layer was performed on the copper foil in the following manner. At the outset, the copper foil was immersed for 2 minutes at 40° C. in an acidic cleaner for printed-wiring board (PAC-200 produced by Murata Co., Ltd.) of which the concentration was adjusted to 120 ml/L with added water. The copper foil thus cleansed was immersed in 50 ml/L sulfuric acid at room temperature for 1 minute to be made acid-activated. The acid-activated copper foil was immersed in a chromium plating bath in which 180 g/L Econo-Chrome 300 (produced by Meltex Inc.) and 1 g/L pure concentrated sulfuric acid were dissolved, and was subjected to a chromium plating for 15 minutes under the conditions of a temperature of 45° C. and a current density of 20 A/dm$^2$. The copper foil on which the chromium plating was formed was washed with water and then dried. The thickness of the resultant chromium plating was about 2 μm as measured by XRF (X-ray fluorescence analysis). Numerous cracks, which would have been formed by plating stress, were confirmed on the surface of the chromium plating.

A copper sulfate plating was performed on the chromium plating where the cracks were generated. In this copper sulfate plating, the chromium-plated copper foil was immersed in a copper sulfate plating bath in which 250 g/L copper sulfate pentahydrate (having a copper concentration of about 64 g/L) and 80 g/L sulfuric acid were dissolved, and plated under the conditions including a current density of 20 A/dm$^2$, a plating time of 150 seconds; an anode being DSE (dimensionally stabilized electrode); and a bath temperature of 40° C. During the plating, since current flows more easily on the crack part than on the outermost surface of the chromium plating, copper particles originating from the cracks have grown. As a result, a two-dimensional network structure composed of copper fibers was formed, as a porous metal foil, on the chromium plating. Finally, the porous metal foil was physically peeled off from the chromium plating to obtain an isolated porous metal foil.

Example A2

Observation on Porous Metal Foil

Figure 8:
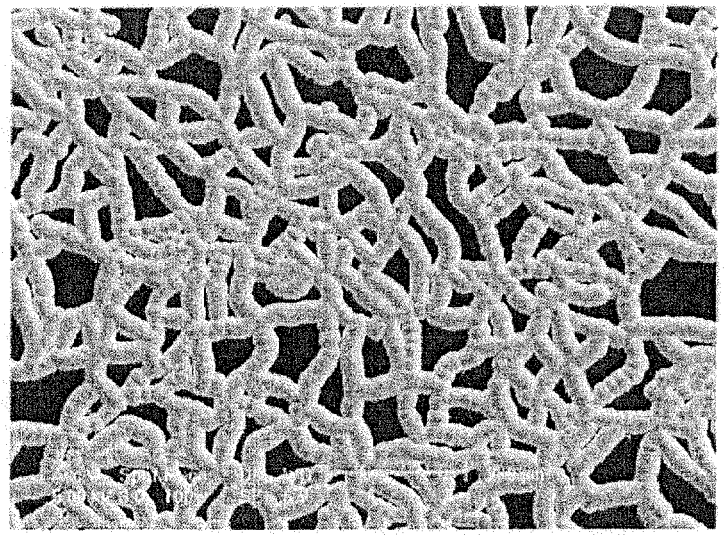
FIG. 8 is an FE-SEM image obtained in Example A2 by observing the side which did not contact the peelable layer of the porous metal foil according to the present invention, from straight above (at a tilt angle of 0°).
Figure 9:
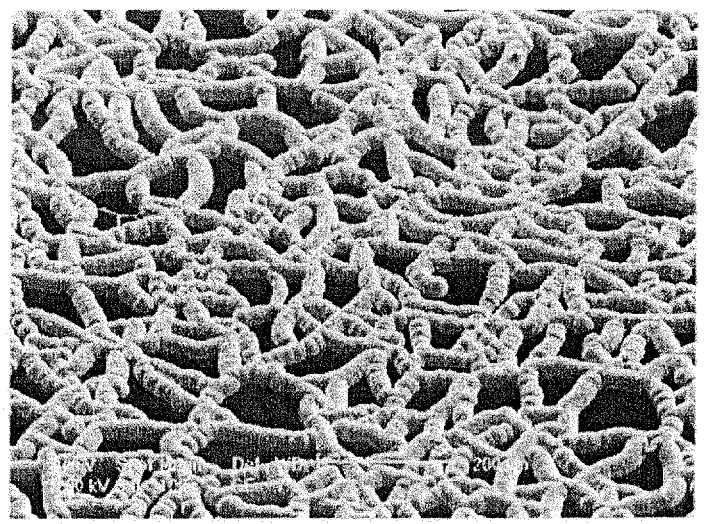
FIG. 9 is an FE-SEM image obtained in Example A2 by observing the side which did not contact the peelable layer of the porous metal foil according to the present invention, from obliquely above (at a tilt angle of 45°).
Figure 10:
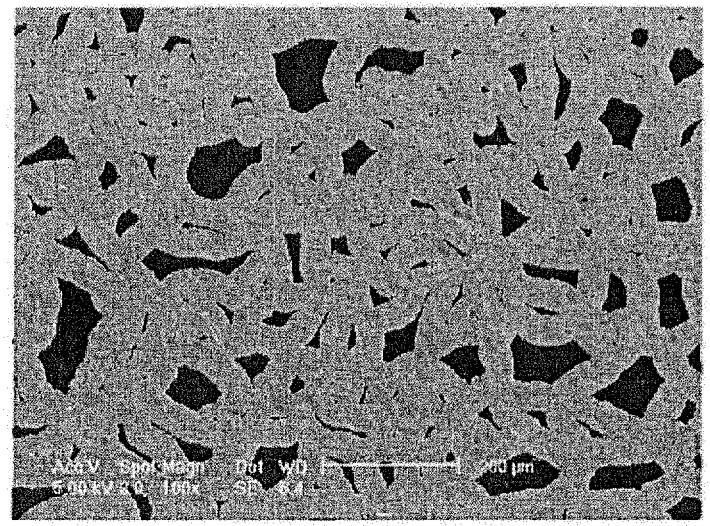
FIG. 10 is an FE-SEM image obtained in Example A2 by observing the side which contacted the peelable layer of the porous metal foil according to the present invention, from straight above (at a tilt angle of 0°).
Figure 11:
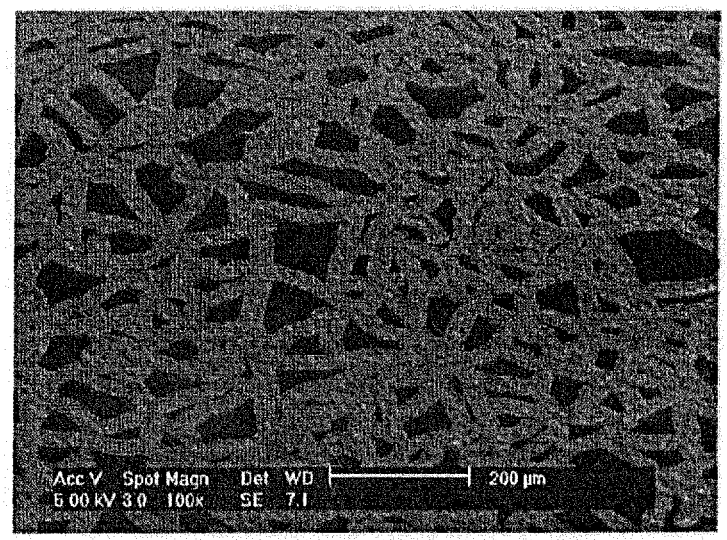
FIG. 11 is an FE-SEM image obtained in Example A2 by observing the side which contacted the peelable layer of the porous metal foil according to the present invention, from obliquely above (at a tilt angle of 45°).

The porous metal foil obtained in Example A1 was observed by a field emission-scanning electron microscope (FE-SEM) from different angles. At the outset, the side which had not been in contact with the peelable layer of the porous metal foil (hereinafter, growth side) was observed from straight above (at a tilt angle of 0°) and obliquely above (at a tilt angle of 45°) to obtain image shown in FIGS. 8 and 9, respectively. After the porous metal foil was turned back, the other side which had been in contact with the peelable layer of the porous metal foil (hereinafter, peelable side) was also observed from straight above (at a tilt angle of 0°) and obliquely above (at a tilt angle of 45°) to obtain image shown in FIGS. 10 and 11, respectively. As is clear from these figures, beaded unevenness derived from the spherical parts of the metal particles was observed on the growth side, while a plane derived from the bottom part of the metal particles and center lines formed along the cracks were observed on the peelable side.

Figure 12:
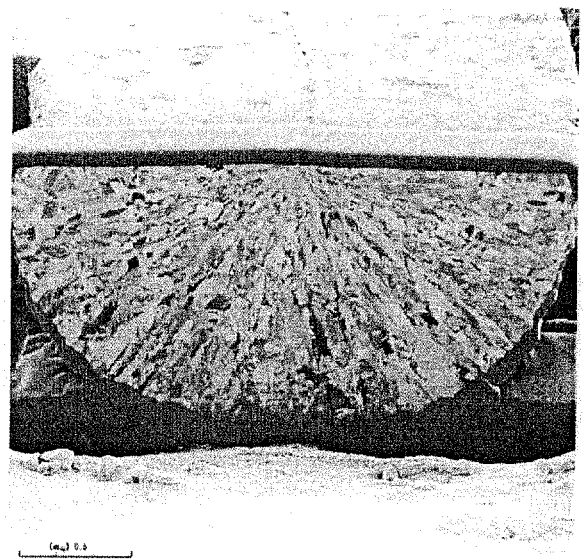
FIG. 12 is a SIM image obtained in Example A2 by observing the cross-sectional surface formed by vertically cutting the metal fiber composing the porous metal foil according to the present invention, at a tilt angle of 60°.

Furthermore, a cross-sectional surface of the metal fiber of the porous metal foil was observed by a scanning ion microscope (SIM) to obtain an image shown in FIG. 12, after having been processed by a focused ion beam processing apparatus (FIB). As shown in this figure, it was observed that the cross-sectional structure of the metal fiber had been created by deposition occurred radically from the crack as a starting point, and that the cross-sectional shape of the metal fiber was in the form of a semilunar including a spherical part and a flat bottom. The fiber diameter (thickness) of the metal fiber was 30 μm as calculated by using the scales shown in these figures. The ratio of the maximum cross-sectional height H to the fiber diameter D at the cross-sectional surface of the metal fiber was calculated to be about 0.50. The number of pores per unit area was about 300/mm². The largest pore area observed was about 4700 μm², while the ratio of the number of pores having pore areas not more than one-half of the largest pore area (i.e., not more than about 2350 μm²) to the number of the total pores was about 90%.

Example A3

Measurement of Aperture Ratio

The aperture ratio of the porous metal foil obtained in Example A1 was determined by weight method in the following manner. At the outset, the thickness of the porous metal foil was measured to be 14.7 μm by a digital length measuring system (Digimicro MH-15M manufactured by Nikon Corporation). In this measurement, MS-5C (manufactured by Nikon Corporation) was used as a measuring stand, while a spindle which is the standard equipment of Digimicro MH-15M was used. The unit weight per 100 mm×100 mm square of the foil was measured to be 0.94 g. On the other hand, the theoretical weight of a non-porous copper foil having a thickness of 14.7 μm and an area of 100 mm×100 mm square was calculated to be 1.31 g, using the copper density of 8.92 g/cm³. With these values, the aperture ratio of the porous metal foil was calculated to be 28% as shown below.

(Aperture ratio)=100−[(Unit weight of the sample)/(Theoretical weight of the non-porous copper foil)]×100=100−[(0.94)/(1.31)]×100=28%

Example A4

Measurement of Tensile Strength

Figure 13:
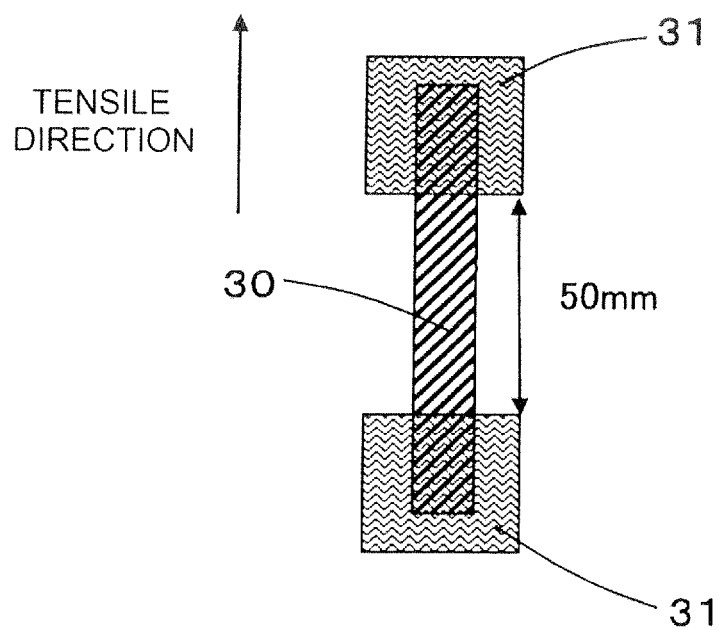
FIG. 13 is a schematic view showing the fixation of a metal foil sample to fixtures in the tensile strength test conducted in Example A4.

The tensile strength of the porous metal foil obtained in Example A1 was measured in accordance with JIS C 6511-1992 as shown below. At the outset, a test piece having a size of 10 mm×100 mm was cut off from the porous metal foil. As shown in FIG. 13, this test piece 30 was fixed with its both ends being held by an upper fixture 31 and a lower fixture 31 of a tensile strength tester (Autograph manufactured by Shimadzu Corporation) so that the distance between the two fixtures could be 50 mm. The tensile strength was then measured by stretching the test piece at a tension rate of 50 mm/minute. In this measurement, a load cell of 1 kN was used in the tensile strength tester. As a result, the tensile strength was 15 N/10 mm width. The percentage of elongation of the test piece during the measurement was 0.8%. From this result, the porous metal foil according to the present invention is considered to have a strength endurable for practical use.

Example B1

Preparation of Porous Metal Foil

A stainless steel plate made of SUS304 was prepared as an electrically conductive substrate. A chromium plating for forming a peelable layer with a thickness of 2 μm was performed on the stainless steel plate in the following manner. At the outset, the stainless steel plate was immersed for 2 minutes at 40° C. in an acidic cleaner for printed-wiring board (PAC-200 produced by Murata Co., Ltd.) of which the concentration was adjusted to 120 ml/L with added water. The stainless steel plate thus cleansed was immersed in 50 ml/L sulfuric acid at room temperature for 1 minute to be made acid-activated. The acid-activated stainless steel plate was immersed in a commercially available hard chromium plating bath (HEEF-25 produced by Atotech), and was subjected to a chromium plating under the conditions of a cathode current density of 20 A/dm²; an electrolysis time of 400 seconds; a bath temperature of 45° C.; a coulomb amount of 8000 C/dm²; an electrode area of 1.2 dm²; and a distance between electrodes of 90 mm. The stainless steel plate on which the chromium plating was formed was washed with water and then dried. The thickness of the resultant chromium plating was about 2 μm as measured by XRF (X-ray fluorescence analysis). Numerous cracks, which would have been formed by plating stress, were confirmed on the surface of the chromium plating.

A silver plating was performed on the chromium plating where the cracks generated. In this silver plating, the chromium-plated stainless steel plate was immersed in a commercially available silver plating bath (Selenabright C produced by Japan Pure Chemical Co., Ltd.), in which 25 g/L potassium cyanide, silver potassium cyanide (50 g/L as silver), a phosphate and the like were dissolved, and plated under the conditions including a cathode current density of 1.0 A/dm²; an electrolysis time of 469 seconds; and a bath temperature of 40° C. During the plating, since current flows more easily on the crack part than on the outermost surface of the chromium plating, silver particles originating from the cracks have grown. As a result, a two-dimensional network structure composed of silver fibers was formed, as a porous metal foil, on the chromium plating. Finally, the porous metal foil was physically peeled off from the chromium plating to obtain an isolated porous metal foil.

Example B2

Observation on Porous Metal Foil

Figure 14:
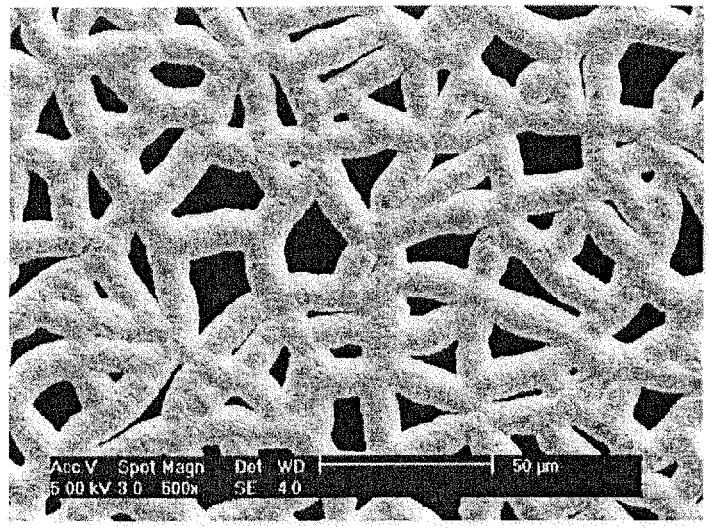
FIG. 14 is an FE-SEM image obtained in Example B2 by observing the side which did not contact the peelable layer of the porous metal foil according to the present invention, from straight above (at a tilt angle of 0°).
Figure 15:
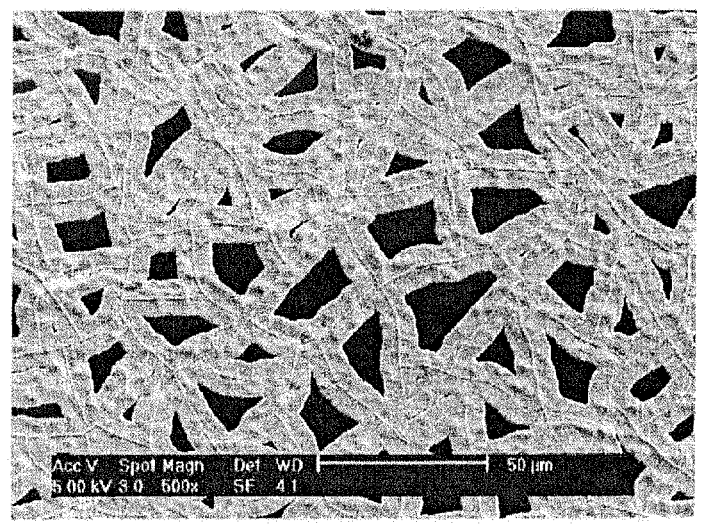
FIG. 15 is an FE-SEM image obtained in Example B2 by observing the side which contacted the peelable layer of the porous metal foil according to the present invention, from straight above (at a tilt angle of 0°).
Figure 16A:
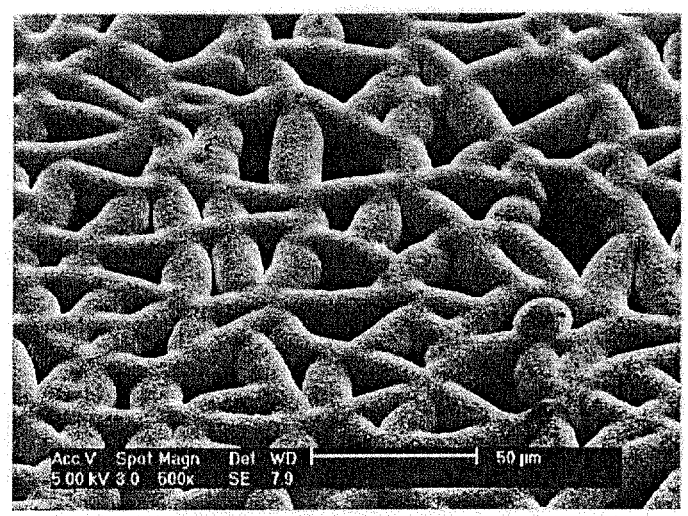
FIG. 16A is an FE-SEM image obtained by observing the side which did not contact the peelable layer of the test piece 1 obtained in Example D1.
Figure 16B:
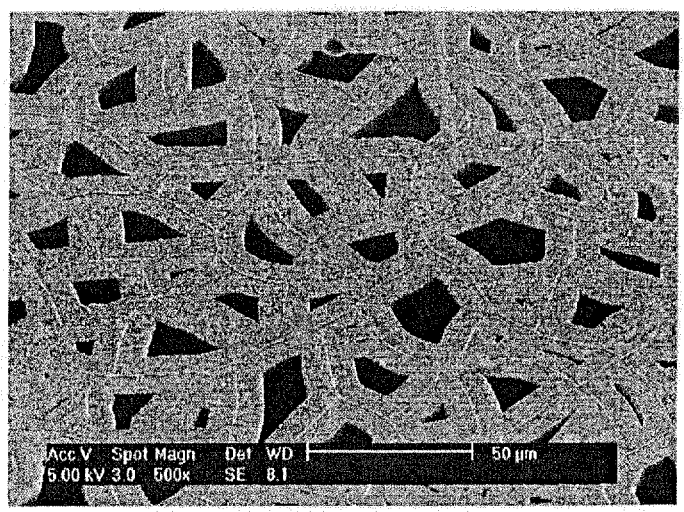
FIG. 16B is an FE-SEM image obtained by observing the side which contacted the peelable layer of the test piece 1 obtained in Example D1.
Figure 17A:
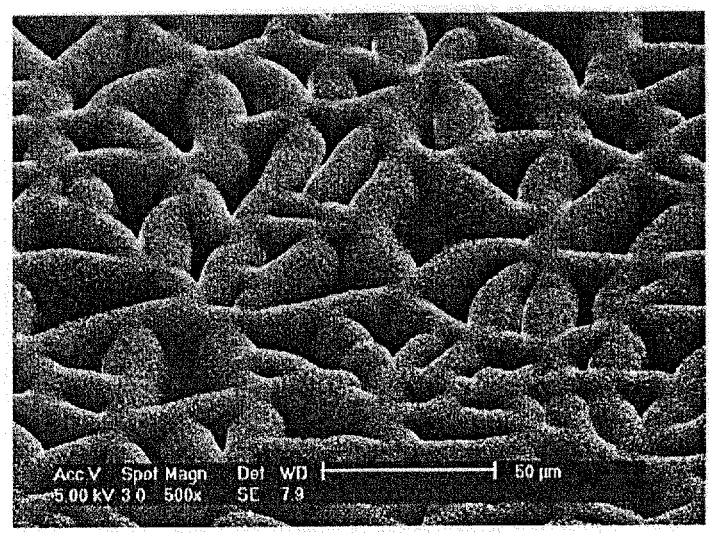
FIG. 17A is an FE-SEM image obtained by observing the side which did not contact the peelable layer of the test piece 2 obtained in Example D1.
Figure 17B:
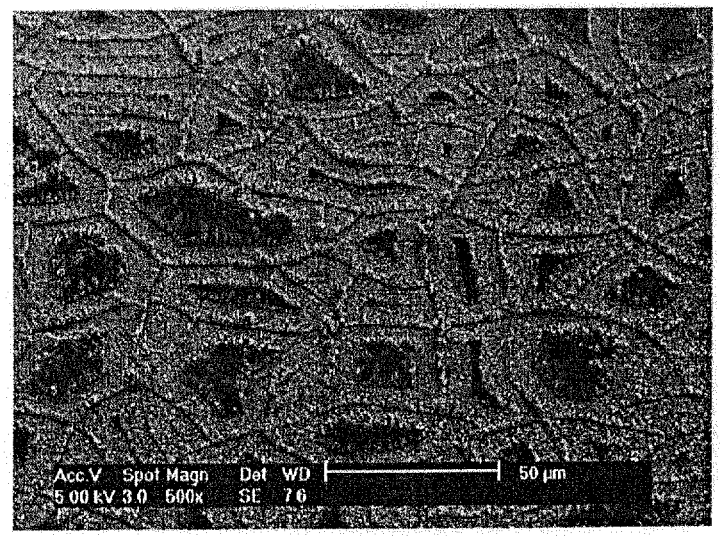
FIG. 17B is an FE-SEM image obtained by observing the side which contacted the peelable layer of the test piece 2 obtained in Example D1.
Figure 18A:
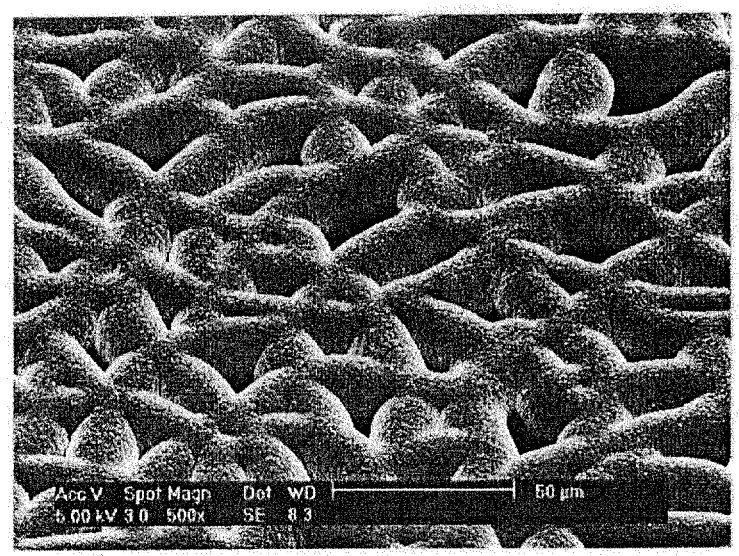
FIG. 18A is an FE-SEM image obtained by observing the side which did not contact the peelable layer of the test piece 3 obtained in Example D1.
Figure 18B:
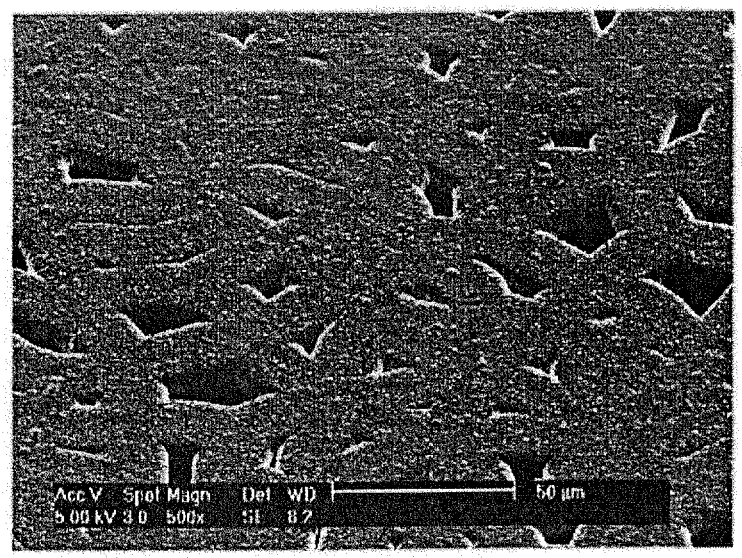
FIG. 18B is an FE-SEM image obtained by observing the side which contacted the peelable layer of the test piece 3 obtained in Example D1.
Figure 19A:
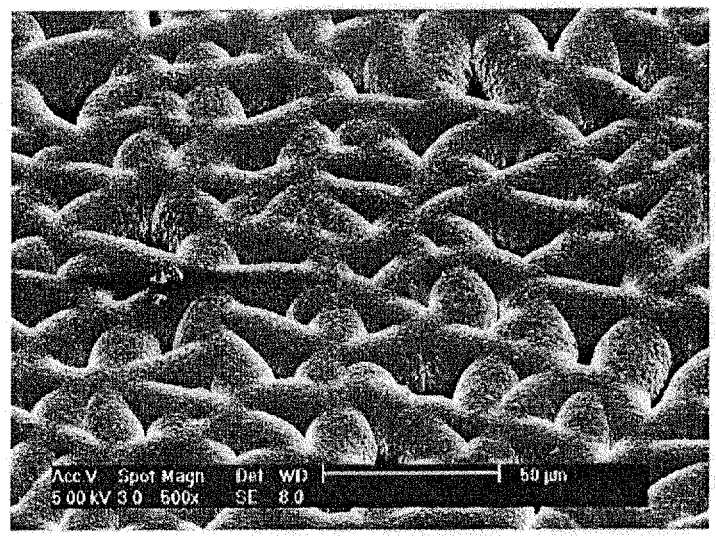
FIG. 19A is an FE-SEM image obtained by observing the side which did not contact the peelable layer of the test piece 4 obtained in Example D1.
Figure 19B:
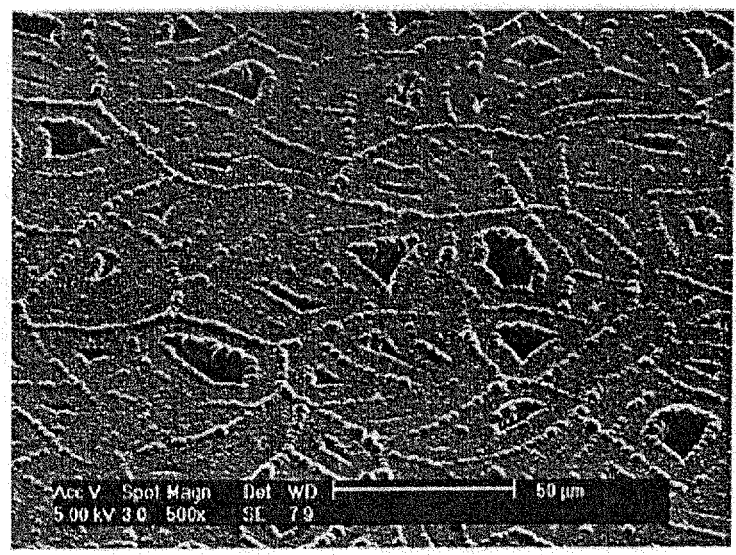
FIG. 19B is an FE-SEM image obtained by observing the side which contacted the peelable layer of the test piece 4 obtained in Example D1.
Figure 20A:
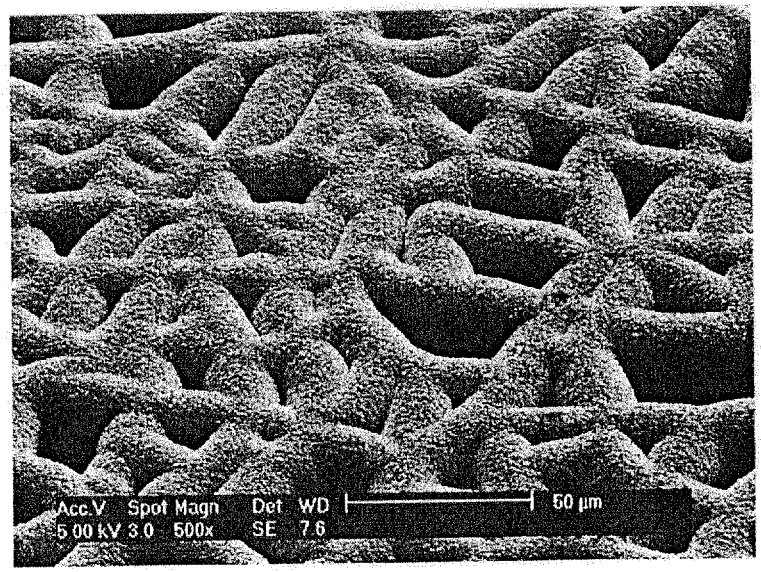
FIG. 20A is an FE-SEM image obtained by observing the side which did not contact the peelable layer of the test piece 5 obtained in Example D1.
Figure 20B:
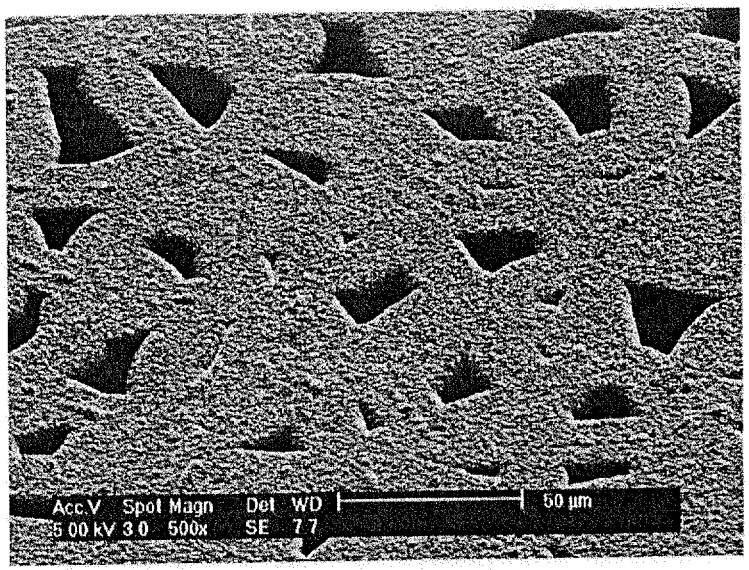
FIG. 20B is an FE-SEM image obtained by observing the side which contacted the peelable layer of the test piece 5 obtained in Example D1.
Figure 21A:
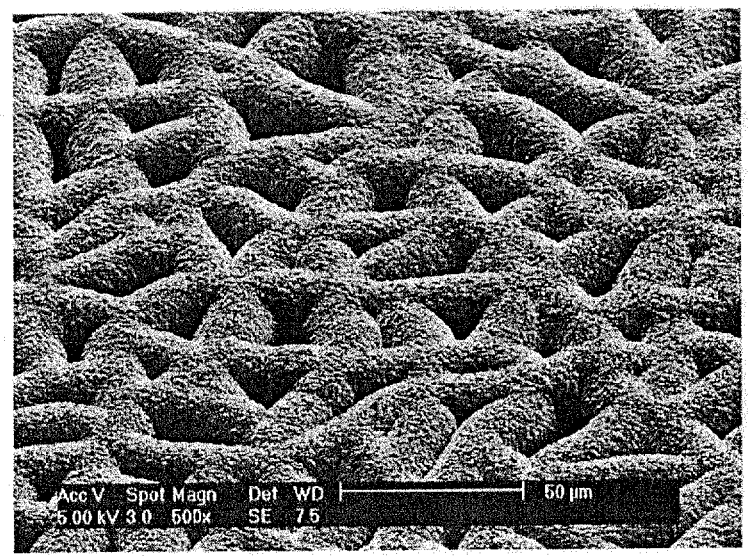
FIG. 21A is an FE-SEM image obtained by observing the side which did not contact the peelable layer of the test piece 6 obtained in Example D1.
Figure 21B:
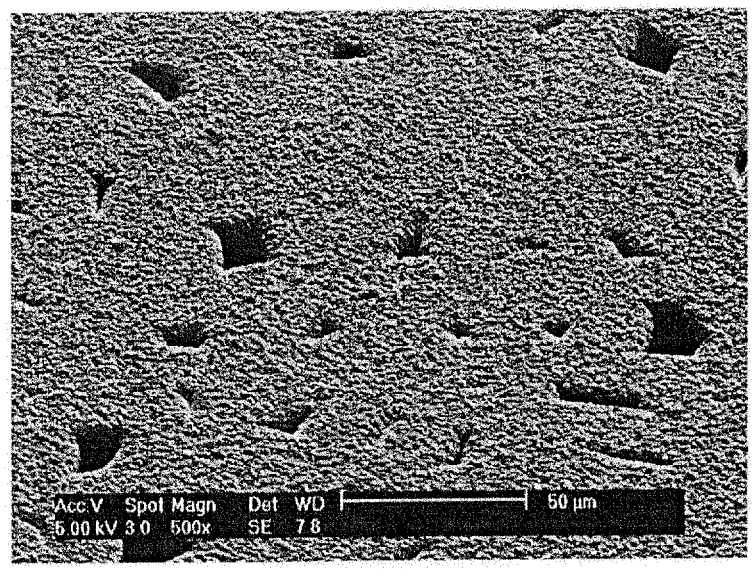
FIG. 21B is an FE-SEM image obtained by observing the side which contacted the peelable layer of the test piece 6 obtained in Example D1.
Figure 22A:
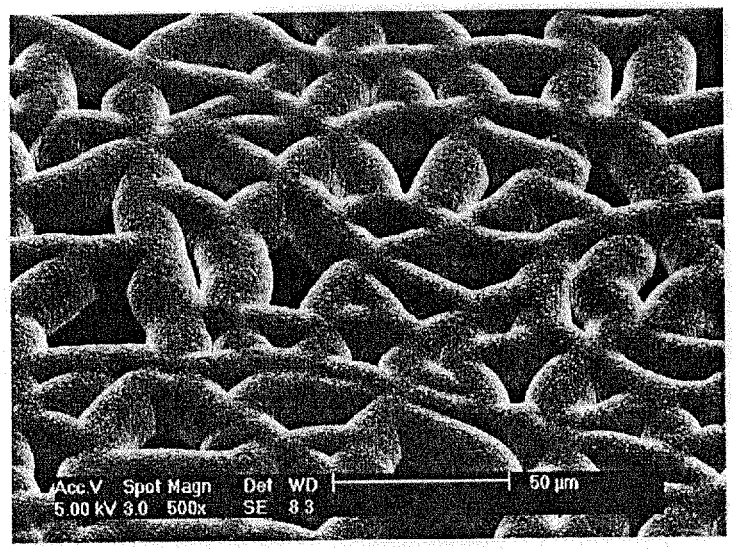
FIG. 22A is an FE-SEM image obtained by observing the side which did not contact the peelable layer of the test piece 7 obtained in Example D1.
Figure 22B:
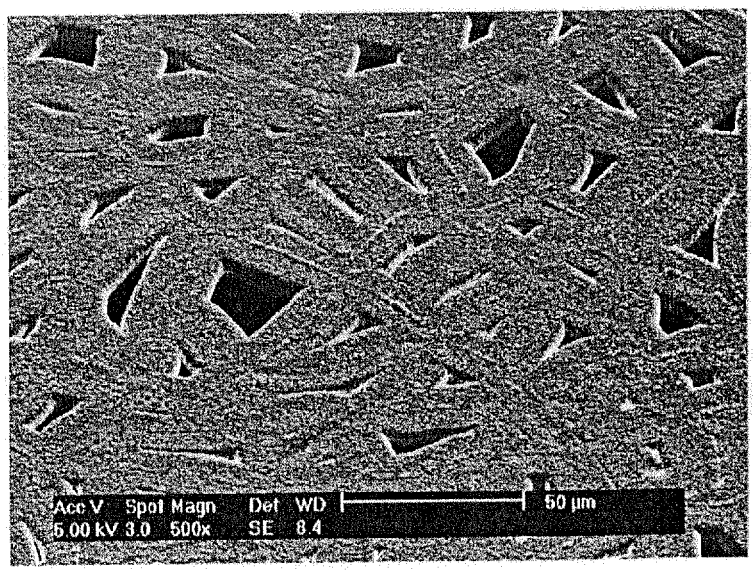
FIG. 22B is an FE-SEM image obtained by observing the side which contacted the peelable layer of the test piece 7 obtained in Example D1.

The porous metal foil obtained in Example B1 was observed by a field emission-scanning electron microscope (FE-SEM) from different angles. At the outset, the side which had not been in contact with the peelable layer of the porous metal foil (hereinafter, growth side) was observed from straight above (at a tilt angle of 0°) to obtain an image shown in FIG. 14. After the porous metal foil was turned back, the other side which had been in contact with the peelable layer of the porous metal foil (hereinafter, peelable side) was also observed from straight above (at a tilt angle of 0°) to obtain an image shown in FIG. 15. As is clear from these figures, beaded unevenness derived from the spherical parts of the metal particles was observed on the growth side, while a plane derived from the bottom part of the metal particles and center lines formed along the cracks were observed on the peelable side. The fiber diameter (thickness) of the metal fiber was 11 μm as calculated by using the scales shown in these figures. The ratio of the maximum cross-sectional height H to the fiber diameter D at the cross-sectional surface of the metal fiber was calculated to be about 0.50. The number of pores per unit area was about 2,000/mm². The largest pore area observed was about 462 μm², while the ratio of the number of pores having pore areas not more than one-half of the largest pore area (i.e., not more than about 231 μm²) to the number of the total pores was about 97%.

Example B3

Measurement of Aperture Ratio

The aperture ratio of the porous metal foil obtained in Example B1 was determined by weight method in the following manner. At the outset, the thickness of the porous metal foil was measured to be 6.4 μm by a digital length measuring system (Digimicro MH-15M manufactured by Nikon Corporation). In this measurement, MS-5C (manufactured by Nikon Corporation) was used as a measuring stand, while a spindle which is the standard equipment of Digimicro MH-15M was used. The unit weight per 100 mm×100 mm square of the foil was measured to be 0.450 g. On the other hand, the theoretical weight of a non-porous silver foil having a thickness of 6.4 μm and an area of 100 mm×100 mm square was calculated to be 0.672 g, using the silver density of 10.49 g/cm³. With these values, the aperture ratio of the porous metal foil was calculated to be 33% as shown below.

$$\text{(Aperture ratio)} = 100 - [(\text{Unit weight of the sample})/$$
$$(\text{Theoretical weight of the non-porous}$$
$$\text{silver foil})] \times 100$$
$$= 100 - [(0.450)/(0.672)] \times 100$$
$$= 33\%$$

Example C1

Preparation of Composite Metal Foil

A preparation example of a composite metal foil is shown below. First, a primer liquid containing a carbon black powder having an average primary particle diameter of 20 nm and a polyvinylidene fluoride (PVdF) in a weight ratio of 50:50 dispersed in N-methylpyrrolidone (NMP) is obtained. The average primary particle diameter, the weight ratio, the amount of N-methylpyrrolidone and the like may be appropriately adjusted depending on the aperture ratio of the porous metal foil, coating conditions and the like. This primer liquid is applied to the both sides of the porous metal foil prepared in Example A1 as shown in FIG. 7 by using a vertical-type double-side dip coater. Subsequently, the metal foil coated with the primer liquid is dried to obtain a composite metal foil.

Example D1

Preparation of Porous Copper Foil with Reduced Glossiness Ratio

In basically the same manner as in Example A1, a porous copper foil was prepared. A post-plating by copper sulfate plating was performed on the porous copper foil once or twice in accordance with various conditions shown in Table 2. With regard to the compositions for post-plating, the same composition as that of a copper sulfate plating used in Example A1 (referred to a basic composition in the table) was used, or 50 ppm chloride ions were added by adding hydrochloric acid to this composition as an additive (referred to as a basic composition+50 ppm Cl⁻ in the table), or a copper sulfate plating bath containing 50 g/L of copper sulfate pentahydrate (having a copper concentration of about 13 g/L) as a roughening plating solution and 100 g/L of sulfuric acid dissolved therein (referred to a roughening plating solution in the table). Then, the obtained copper foil was subjected to a rustproofing treatment using benzotriazole (BTA) or Ni—Zn to prepare porous copper foil test pieces having decreased glossiness ratios (test pieces 2 to 7). For reference, test pieces 1 and 7 were also prepared by subjecting only to rustproofing treatment without performing post-plating. With regard to the obtained test pieces 1 to 7, the original thickness, the thickness added by post-plating, the weight per 50 square mm, the weight aperture ratio, the glossiness $G_S$ of the first side (high glossiness side), the glossiness $G_M$ of the second side (low glossiness side), and the glossiness ratio $G_S/G_M$ were measured. The glossiness was measured at incident and reflection angles of 60 degrees in accordance with JIS Z 8741 (1997), using a gloss meter (product name: VG-2000, manufactured by Nippon Denshoku Industries Co., Ltd.). The results are as shown in Table 2.

The obtained porous metal foil was observed by a field emission-scanning electron microscope (FE-SEM). At the outset, the side which had not been in contact with the peelable layer of the porous metal foil (hereinafter, growth side) was observed from obliquely above (at a tilt angle of 45°) to obtain images shown in A series of FIGS. 16A to 22A, respectively. After the porous metal foil was turned back, the other side which had been in contact with the peelable layer of the porous metal foil (hereinafter, peelable side) was also observed from obliquely above (at a tilt angle of 45°) to obtain images shown in series B of FIGS. 16B to 22B, respectively.

TABLE 2

| Test Piece No. | Thickness of Copper Foil (μm) | Thickness of Post-Plating (μm) | Composition of Electrolytic Post-Plating Solution | Post-Plating Conditions | Rustproofing Treatment | Weight per 50 square mm (g) | Weight Aperture Ratio (%) | Glossiness of First Side | Glossiness of Second Side | Glossiness Ratio $G_S/G_M$ |
|---|---|---|---|---|---|---|---|---|---|---|
| 1 | 10.2 | 0 | — | — | BTA | 0.1689 | 25.7 | 339.6 | 19.4 | 17.5 |
| 2 | 11.8 | 1.8 | Roughening Plating Solution | at 30 A/dm² for 10 seconds | BTA | 0.1841 | 30.0 | 2.4 | 1.5 | 1.6 |
| 3 | 14.5 | 4.5 | Basic Composition | at 20 A/dm² for 75 seconds | BTA | 0.2666 | 17.6 | 276.6 | 20.6 | 13.4 |

TABLE 2-continued

| Test Piece No. | Thickness of Copper Foil (μm) | Thickness of Post-Plating (μm) | Composition of Electrolytic Post-Plating Solution | Post-Plating Conditions | Rustproofing Treatment | Weight per 50 square mm (g) | Weight Aperture Ratio (%) | Glossiness of First Side | Glossiness of Second Side | Glossiness Ratio $G_S/G_M$ |
|---|---|---|---|---|---|---|---|---|---|---|
| 4 | 14.5 | 4.5 | Roughening Plating Solution and Basic Composition | First Time: at 30 A/dm² for 3 seconds (Roughening Plating Solution) Second Time: at 20 A/dm² for 75 seconds (Basic Composition) | BTA | 0.2697 | 16.6 | 232.7 | 24.9 | 9.4 |
| 5 | 14.6 | 4.6 | Basic Composition + Cl⁻ 50 ppm | at 20 A/dm² for 75 seconds | BTA | 0.2662 | 18.2 | 151.1 | 11.8 | 12.8 |
| 6 | 16.9 | 6.9 | Basic Composition + Cl⁻ 50 ppm | at 20 A/dm² for 120 seconds | BTA | 0.3270 | 13.2 | 31.7 | 11.6 | 2.7 |
| 7 | 12.8 | 2.8 | Basic Composition | at 20 A/dm² for 40 seconds | Both Sides of NiZn at 1.11 A/1.2 dm² for 10 seconds | 0.2205 | 22.8 | 283.0 | 19.4 | 14.6 |

Example D2

Relation Between Weight Aperture Ratio and Thickness

In basically the same manner as in Example A1, porous copper foils having various thicknesses as shown in Table 3 (test pieces 8 to 14) were prepared. A post-plating by copper sulfate plating was performed on the test pieces 13 and 14 once in accordance with various conditions shown in Table 3. With regard to the composition of post-plating, the same composition as that of the copper sulfate plating used in Example A1 was used. With regard to the obtained test pieces 8 to 14, the original thickness, the thickness added by post-plating, the weight per 50 square mm, and the weight aperture ratio were measured. The results are as shown in Table 3. With regard to the test pieces 13 and 14, the glossiness was measured and the glossiness ratio $G_S/G_M$ was calculated. As a result, the glossiness ratio was 11.3 and 9.2, respectively. The glossiness was measured at incident and reflection angles of 60 degrees in accordance with JIS Z 8741 (1997).

aperture ratio is less likely to decrease, namely, pores are less likely to be filled, as compared with a porous metal foil having the same thickness produced only by the foil forming step without post-plating.

Example D3

Preparation of Porous Metal Foil Imparted with Unevenness

A copper foil having a thickness of 35 μm was prepared as an electrically conductive substrate. A chromium plating for forming a peelable layer was performed on the copper foil in the following manner. At the outset, the copper foil was immersed for 2 minutes at 40° C. in an acidic cleaner for printed-wiring board (PAC-200, manufactured by Murata Co., Ltd.) of which the concentration was adjusted to 120 ml/L with added water. The copper foil thus cleansed was immersed in 50 ml/L sulfuric acid at room temperature for 1 minute to be made acid-activated. The acid-activated copper foil was immersed in a chromium plating bath in which 180 g/L Econo-Chrome 300 (manufactured by Meltex

TABLE 3

| Test Piece No. | Thickness of Copper Foil (μm) | Thickness of Post-Plating (μm) | Composition of Electrolytic Post-Plating Solution | Post-Plating Conditions | Weight per 50 square mm (g) | Weight Aperture Ratio (%) |
|---|---|---|---|---|---|---|
| 8 | 10.2 | 0 | Basic Composition | — | 0.1689 | 25.7 |
| 9 | 12.4 | 0 | Basic Composition | — | 0.2194 | 20.7 |
| 10 | 13.5 | 0 | Basic Composition | — | 0.2457 | 18.4 |
| 11 | 14.8 | 0 | Basic Composition | — | 0.2918 | 11.6 |
| 12 | 17.9 | 0 | Basic Composition | — | 0.3580 | 10.3 |
| 13 | 12.4 | 2.2 | Basic Composition | Post-Plating from side opposite from peelable layer (growth side) at 40 A/dm² for 20 seconds | 0.2193 | 20.7 |
| 14 | 18.0 | 7.8 | Basic Composition | Post-Plating from side opposite from peelable layer (growth side) at 40 A/dm² for 70 seconds | 0.3412 | 15.0 |

Figure 23:
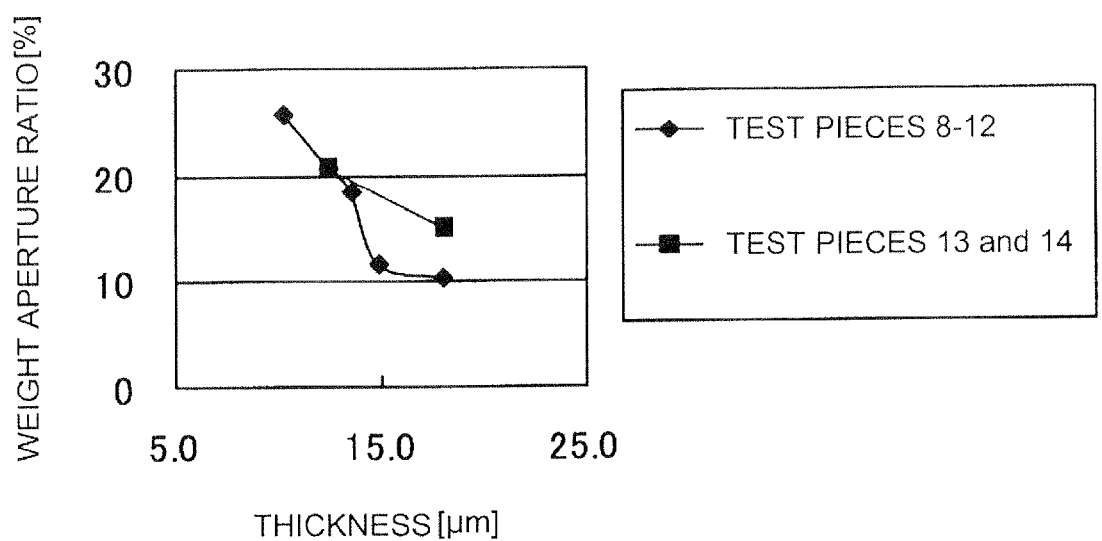
FIG. 23 is a diagram showing a relation between the weight aperture ratio and the thickness of the porous metal foil obtained in Example D2 plotted against the weight aperture ratio.

Based on data shown in Table 3, a relation between the weight aperture ratio and the total thickness of the copper film was plotted. The results are as shown in FIG. 23. As is clear from these results, when the thickness of the porous metal foil is increased using a post-plating method, the Inc.) and 1 g/L pure concentrated sulfuric acid were dissolved, and was subjected to a chromium plating for 15 minutes under the conditions of a temperature of 25° C. and a current density of 20 A/dm². The copper foil on which the chromium plating was formed was washed with water and then dried. Not only numerous cracks, which would have been formed by plating stress, but also numerous mountain-shaped unevenness were confirmed on the surface of the chromium plating.

A copper sulfate plating was performed on the chromium plating where the cracks were generated. In this copper sulfate plating, the chromium-plated copper foil was immersed in a copper sulfate plating bath in which 250 g/L copper sulfate pentahydrate (having a copper concentration of about 64 g/L) and 80 g/L sulfuric acid were dissolved, and plated under the conditions including a current density of 20 A/dm$^2$; a plating time of 150 seconds; an anode being DSE (dimensionally stabilized electrode); and a bath temperature of 40° C. During the plating, since current flows more easily on the crack part than on the outermost surface of the chromium plating, copper particles originating from the cracks have grown. As a result, a two-dimensional network structure composed of copper fibers was formed, as a porous metal foil, on the chromium plating. Finally, the porous metal foil was physically peeled off from the chromium plating to obtain an isolated porous metal foil.

Figure 24A:
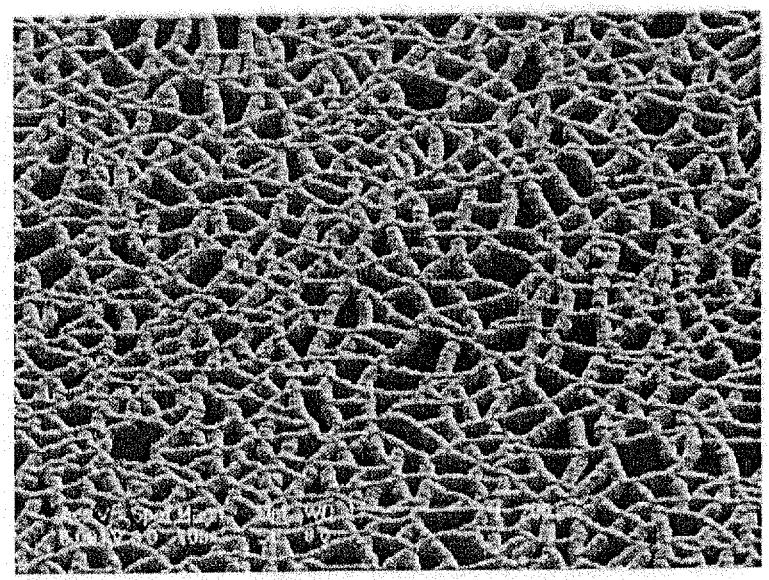
FIG. 24A is an FE-SEM image (at a magnification 100 times) obtained by observing the side which did not contact the peelable layer of the metal foil imparted with unevenness obtained in Example D3.
Figure 24B:
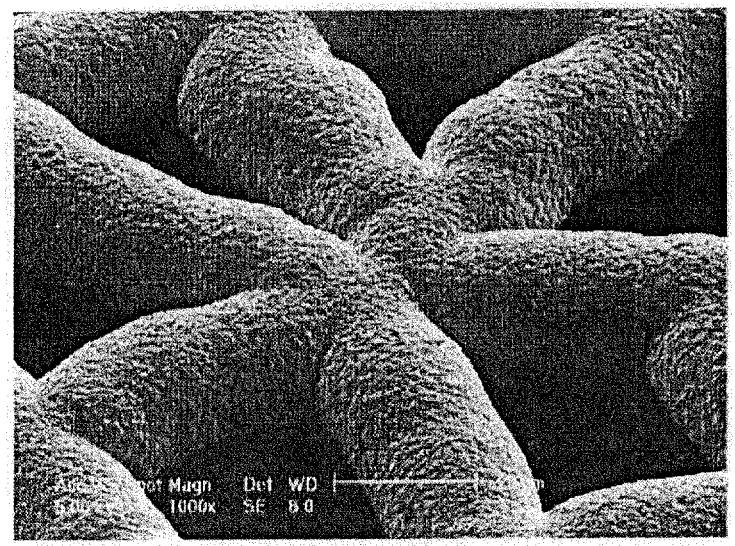
FIG. 24B is an FE-SEM image (at a magnification 1,000 times) obtained by observing the side which did not contact the peelable layer of the metal foil imparted with unevenness obtained in Example D3.
Figure 24C:
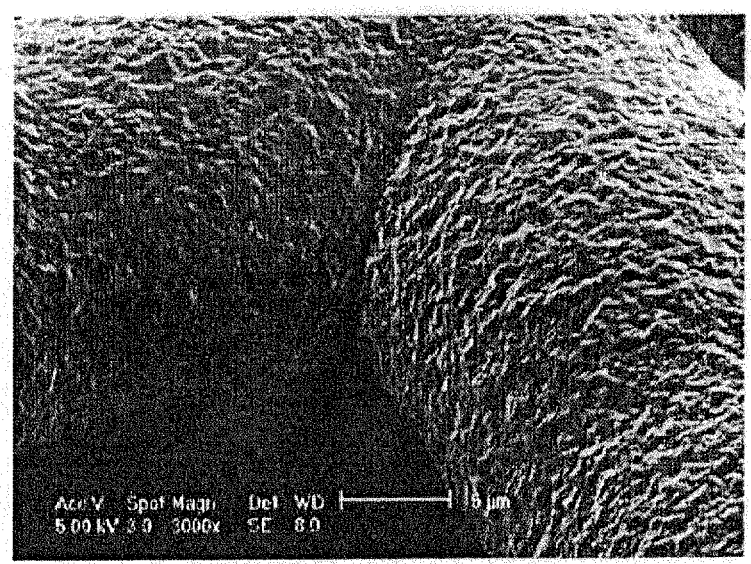
FIG. 24C is an FE-SEM image (at a magnification 3,000 times) obtained by observing the side which did not contact the peelable layer of the metal foil imparted with unevenness obtained in Example D3.
Figure 25A:
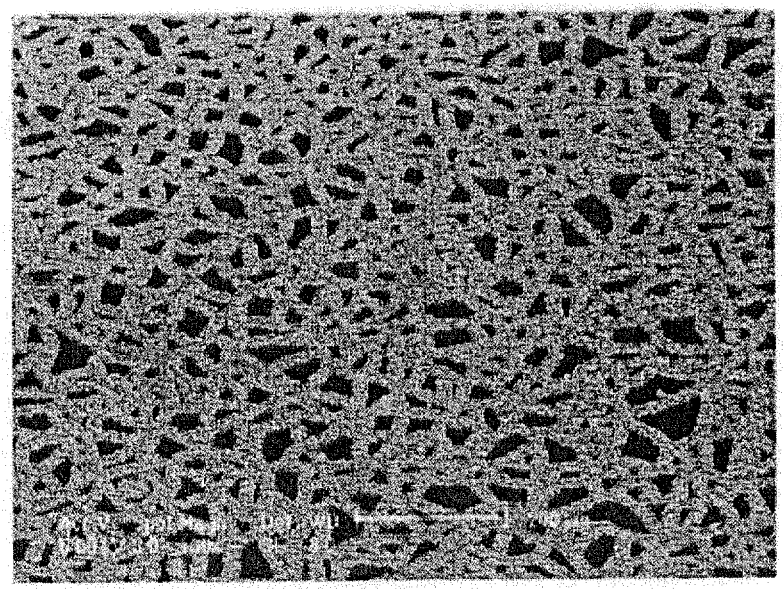
FIG. 25A is an FE-SEM image (at a magnification 100 times) obtained by observing the side which contacted the peelable layer of the metal foil imparted with unevenness obtained in Example D3.
Figure 25B:
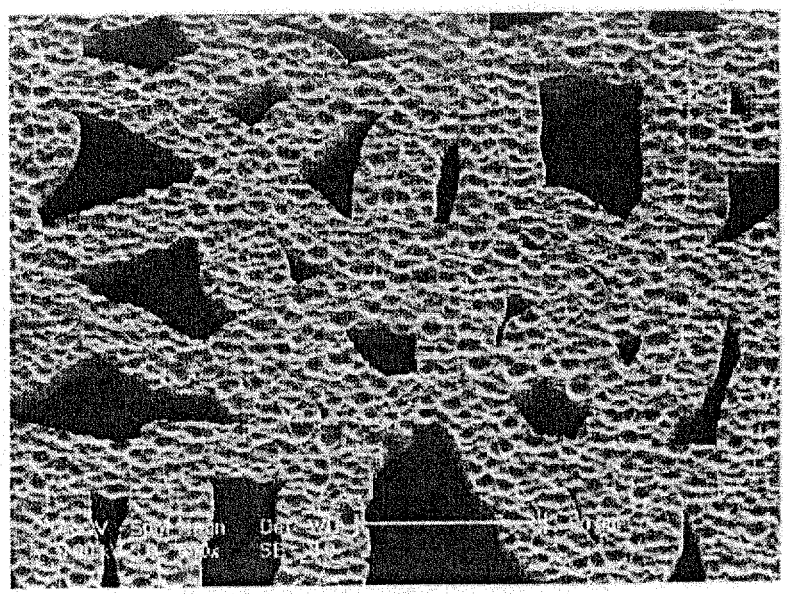
FIG. 25B is an FE-SEM image (at a magnification 500 times) obtained by observing the side which contacted the peelable layer of the metal foil imparted with unevenness obtained in Example D3.
Figure 25C:
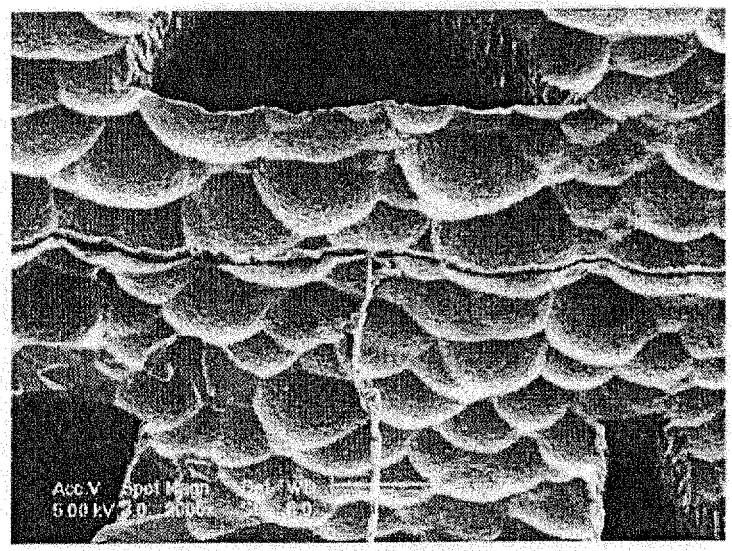
FIG. 25C is an FE-SEM image (at a magnification 3,000 times) obtained by observing the side which contacted the peelable layer of the metal foil imparted with unevenness obtained in Example D3.

The obtained porous metal foil was observed by a field emission-scanning electron microscope (FE-SEM) from different angles. At the outset, the side which had not been in contact with the peelable layer of the porous metal foil (hereinafter, growth side) was observed from obliquely above (at a tilt angle of 45°) to obtain images shown in FIGS. 24A to 24C, respectively. After the porous metal foil was turned back, the other side which had been in contact with the peelable layer of the porous metal foil (hereinafter, peelable side) was also observed from obliquely above (at a tilt angle of 45°) to obtain images shown in FIGS. 25A to 25C. As is clear from these images, formation of the porous metal foil on chromium-plated peelable layer with numerous unevenness formed thereon makes it possible to impart unevenness to the side which had been in contact with the peelable layer, that would have become flat if the peelable layer is flat. It is therefore understood that, in the porous metal foil thus obtained, the existence of unevenness on the both sides reduces the difference in glossiness ratio or properties between the both sides.

Example E1

Comparison of Cracking Selectivity

Figure 26A:
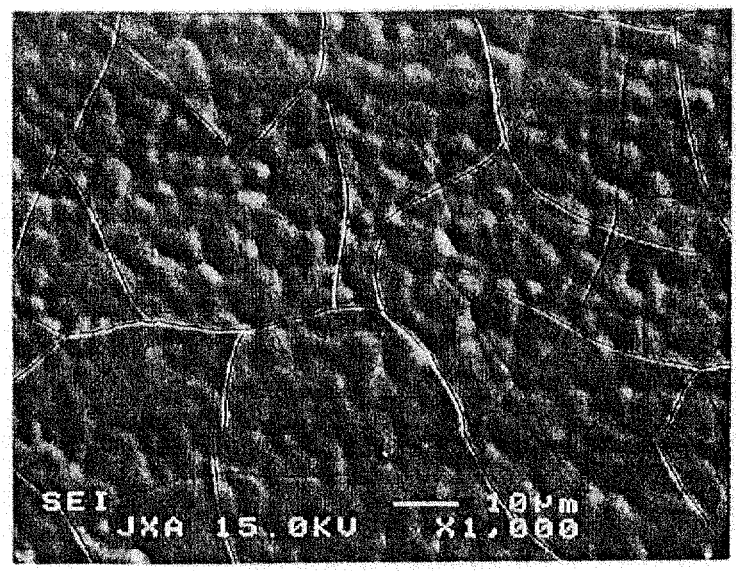
FIG. 26A is an image obtained by observing the surface of the electrode in the as-chromium-plated state obtained in Example E1 using SEM.
Figure 26B:
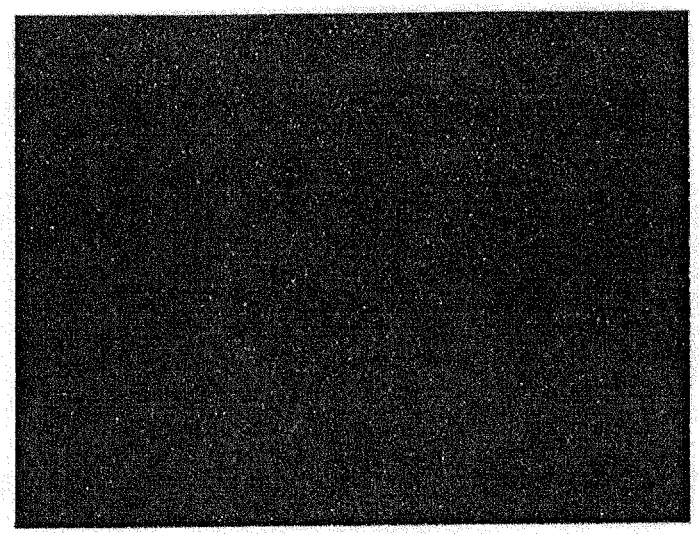
FIG. 26B is a Cu mapping image obtained by observing the surface of the electrode in the as-chromium-plated state obtained in Example E1 using EPMA.
Figure 27:
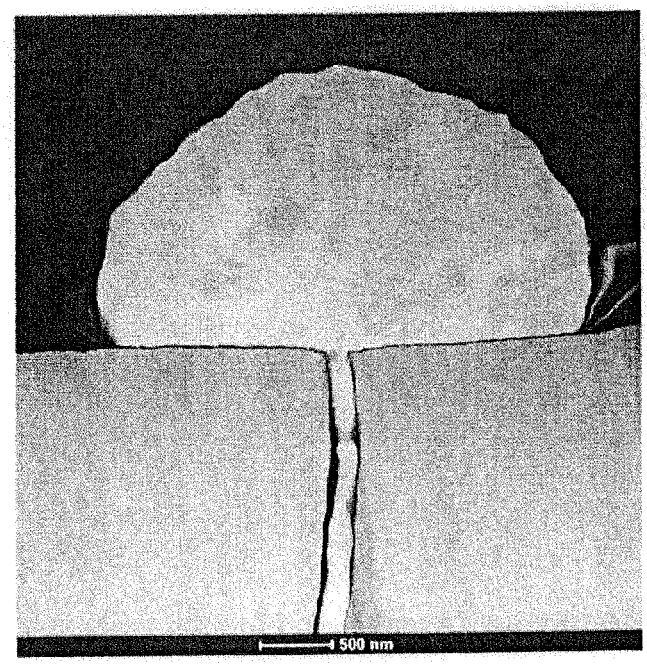
FIG. 27 is an image obtained by observing the cross-sectional surface of the electrode in the state where a crack of chromium plating is filled with copper obtained in Example E1 using SEM.
Figure 28A:
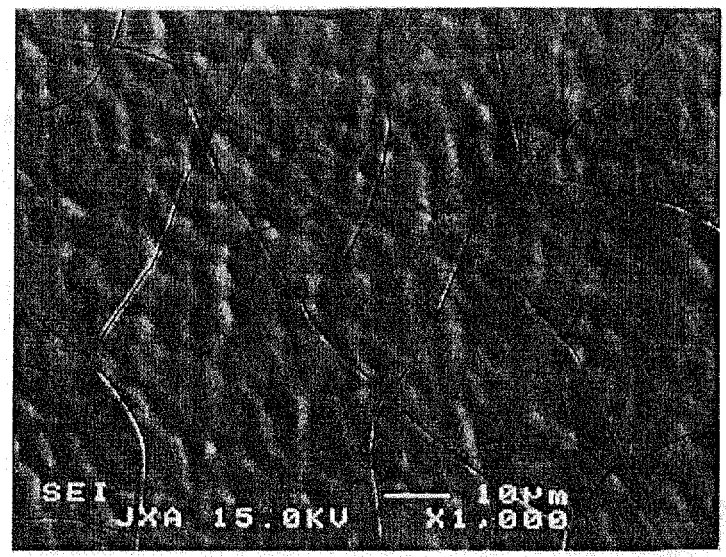
FIG. 28A is an image obtained by observing the surface of the electrode in the state where a crack of chromium plating is filled with copper obtained in Example E1 using SEM.
Figure 28B:
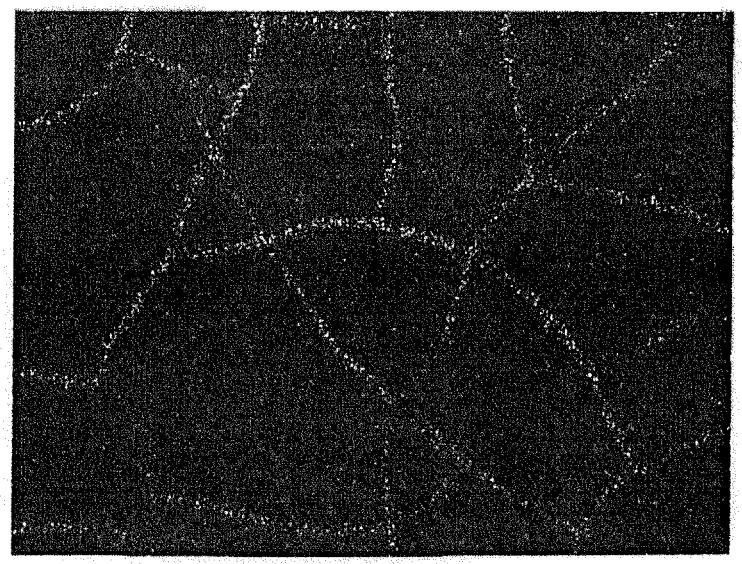
FIG. 28B is a Cu mapping image obtained by observing the surface of the electrode in the state where a crack of chromium plating is filled with copper obtained in Example E1 using EPMA.

In the same manner as in Example A1, a chromium-plated electrode in which cracks are formed on the surface was prepared. The surface of the electrode immediately after the formation of the chromium plating was observed by SEM to obtain an image as shown in FIG. 26A. Cu mapping was performed by an electron probe microanalyzer (EPMA) to obtain a mapping image as shown in FIG. 26B, from which it was confirmed that copper has not yet deposited along the cracks. Using this electrode, copper sulfate plating and peeling of a copper foil were repeated plural times as an idle operation in accordance with the same procedure as in Example A1. At this time, the cross-sectional surface in the vicinity of the cracks of the chromium-plated surface was observed by SEM to obtain an image shown in FIG. 27, from which it was confirmed that the cracks were filled with metal deposits, from which the metal fiber grew. A copper foil was peeled from the electrode surface and the chromium-plated surface was observed by SEM to obtain an image as shown in FIG. 28A. Cu mapping was performed by an electron probe microanalyzer (EPMA) to obtain a mapping image as shown in FIG. 28B, from which it was confirmed that the metal filled in the cracks is copper. In the same manner as in Example A1, a porous copper foil was produced using the electrode having the chromium-plated surface in which the cracks were filled with copper. As a result, it was confirmed that a metal fiber was formed in a smooth linear form, not in a beaded shape in which grown particles are connected to each other.

The invention claimed is:

1. A composite metal foil consisting of:
   a porous metal foil composed of a metal fiber formed from metal particles that are connected to one another via nucleation; and
   a primer provided on at least a part of the interior and/or periphery of pores of the porous metal foil;
   wherein the metal fiber has a metal fiber diameter D, defining a width of a basal plane of the metal fiber, and a spherical part, defining a maximum cross-sectional height H of the metal fiber, and the metal fiber is irregularly networked along the basal plane; and
   wherein the porous metal foil has a thickness in a range of 3 to 40 μm corresponding to the maximum cross-sectional height H of the spherical part of the metal fiber, and a weight-based aperture ratio P of 3 to 60%, wherein the weight-based aperture ratio P is defined as:

$P=100-[(W_p/W_n)\times 100]$, wherein $W_p/W_n$ is a ratio of a weight $W_p$ of the porous metal foil to a theoretical weight $W_n$ of a non-porous metal foil having a composition and dimensions that are identical to those of the porous metal foil.

2. The composite metal foil according to claim 1, wherein the metal fiber diameter D is in a range of 5 to 80 μm.

3. The composite metal foil according to claim 1, wherein the metal fiber is a branched fiber, the branched fiber being irregularly networked.

4. The composite metal foil according to claim 1, wherein the irregularly networked structure of the metal fiber has an irregular shape derived from a crack, which has been formed on a surface of a substrate, in which the metal particles are connected to one another via nucleation.

5. The composite metal foil according to claim 1, wherein the metal fiber comprises at least one selected from the group consisting of copper, aluminum, gold, silver, nickel, cobalt, and tin.

6. The composite metal foil according to claim 1, wherein the pores are filled with the primer over the whole surface of the porous metal foil.

7. The composite metal foil according to claim 1, wherein the primer is a current collector primer.

8. The composite metal foil according to claim 7, wherein the current collector primer comprises an electrically conductive material selected from the group consisting of electrically conductive carbon particles, an electrically conductive carbon fiber, metal particles, and an electrically conductive polymer; and a binder.

9. The composite metal foil according to claim 1, wherein the porous metal foil has a tensile strength of 10N/10 mm or more.

10. A method for producing a composite metal foil, which comprises the steps of:
    preparing an electrically conductive substrate comprising on its surface a peelable layer in which a crack is generated;
    plating the peelable layer with a metal capable of depositing preferentially on the crack, to deposit the metal as metal particles along the crack, thereby forming a porous metal foil consisting of a two-dimensional network structure composed of a metal fiber formed from the metal particles, which are connected to one another via nucleation, wherein the porous metal foil has a thickness of 3 to 40 µm and has a weight-based aperture ratio P of 3 to 60%, wherein the weight-based aperture ratio P is defined as:

$P=100-[(W_p/W_n)\times 100]$, wherein $W_p/W_n$ is a ratio of a weight $W_p$ of the porous metal foil to a theoretical weight $W_n$ of a non-porous metal foil having a composition and dimensions that are identical to those of the porous metal foil;

peeling off the porous metal foil from the peelable layer; and coating the porous metal foil with a primer liquid to obtain a composite metal foil.

11. The method according to claim 10, further comprising the step of drying the primer liquid.

12. The method according to claim 10, wherein the crack has been generated by a stress in the peelable layer.

13. The method according to claim 10, wherein the peelable layer comprises at least one selected from the group consisting of chromium, titanium, tantalum, niobium, nickel, and tungsten, or is composed of an organic material.

14. The method according to claim 10, wherein the peelable layer is composed of chromium, a chromium alloy, or a chromium oxide.

15. The method according to claim 10, wherein the metal capable of depositing preferentially on the crack comprises at least one selected from the group consisting of copper, aluminum, gold, silver, nickel, cobalt, and tin.

16. The method according to claim 10, wherein the composite metal foil has a thickness of 3 to 40 µm.

17. The method according to claim 10, wherein the primer liquid is a current collector primer liquid.

18. The method according to claim 17, wherein the current collector primer liquid comprises an electrically conductive material selected from the group consisting of electrically conductive carbon particles, an electrically conductive carbon fiber, metal particles, and an electrically conductive polymer; a binder; and a solvent.

* * * * *